US012515320B2

(12) United States Patent
Yeap et al.

(10) Patent No.: US 12,515,320 B2
(45) Date of Patent: Jan. 6, 2026

(54) RELIABLE REAL-TIME DEPLOYMENT OF ROBOT SAFETY UPDATES

(71) Applicant: Intel Corporation, Santa Clara, CA (US)

(72) Inventors: Wei Seng Yeap, Penang (MY); Chien Chern Yew, Penang (MY); Ying Wei Liew, Penang (MY); Say Chuan Tan, Penang (MY); Tze Ming Hau, Seremban2 (MY); Frederik Pasch, Karlsruhe (DE); Fabian Oboril, Karlsruhe (DE); Kay-Ulrich Scholl, Malsch (DE); Cornelius Buerkle, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 17/556,788

(22) Filed: Dec. 20, 2021

(65) Prior Publication Data

US 2022/0111516 A1 Apr. 14, 2022

(51) Int. Cl.

*B25J 9/16* (2006.01)
*G05D 1/00* (2024.01)
*G06F 8/65* (2018.01)

(52) U.S. Cl.

CPC ............ *B25J 9/163* (2013.01); *B25J 9/1674* (2013.01); *G05D 1/0291* (2013.01); *G06F 8/65* (2013.01)

(58) Field of Classification Search

CPC ....... B25J 9/163; B25J 9/1674; G05D 1/0291; G05D 1/0055; G06F 8/65

See application file for complete search history.

(56) References Cited

U.S. PATENT DOCUMENTS

| | | | | |
|---|---|---|---|---|
| 11,048,261 | B1 | 6/2021 | Chan et al. | |
| 2019/0262993 | A1 | 8/2019 | Cole et al. | |
| 2022/0300875 | A1* | 9/2022 | Ams | G05B 19/0423 |
| 2024/0330451 | A1* | 10/2024 | Costin | G06Q 50/16 |

OTHER PUBLICATIONS

"European Application Serial No. 22210441.6, Extended European Search Report mailed May 3, 2023", 10 pgs.

"European Application Serial No. 22210441.6, Communication Pursuant to Rule 69 EPC mailed Jun. 26, 2023", 2 pgs.

"European Application Serial No. 22210441.6, Response filed Sep. 29, 2023 to Communication Pursuant to Rule 69 EPC mailed Jun. 26, 2023", 13 pgs.

* cited by examiner

*Primary Examiner* — Dylan M Katz

(74) *Attorney, Agent, or Firm* — Schwegman Lundberg & Woessner, P.A.

(57) ABSTRACT

Systems and techniques for reliable real-time deployment of robot safety updates are described herein. Condition data may be collected for an environment in which a robot is operating. The robot may be classified with a condition type. Condition type data selected from the condition data may be analyzed based on the condition type to calculate a safety risk level for the robot. A microservice may be identified to provide a robot safety rule for the robot based on the safety risk level. The microservice may be identified using a safety prediction model generated from the condition type data.

25 Claims, 19 Drawing Sheets

700

800

RELIABLE REAL-TIME DEPLOYMENT OF ROBOT SAFETY UPDATES

TECHNICAL FIELD

Embodiments described herein generally relate to robot software update deployment and, in some embodiments, more specifically to reliable real-time deployment of robot safety updates.

BACKGROUND

Safe movement of robots ensure health and wellness of humans interacting with robots. Safe operation of robots may rely on a robot being able to adapt to conditions and receive reliable updates. Changing weather conditions and untested updates may cause instability and unsafe operation of the robot leading to human injury, property damage, or damage to the robot. It may be desirable to identify and provide reliable preventative safety measures for the robot to reduce damage to people and property.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
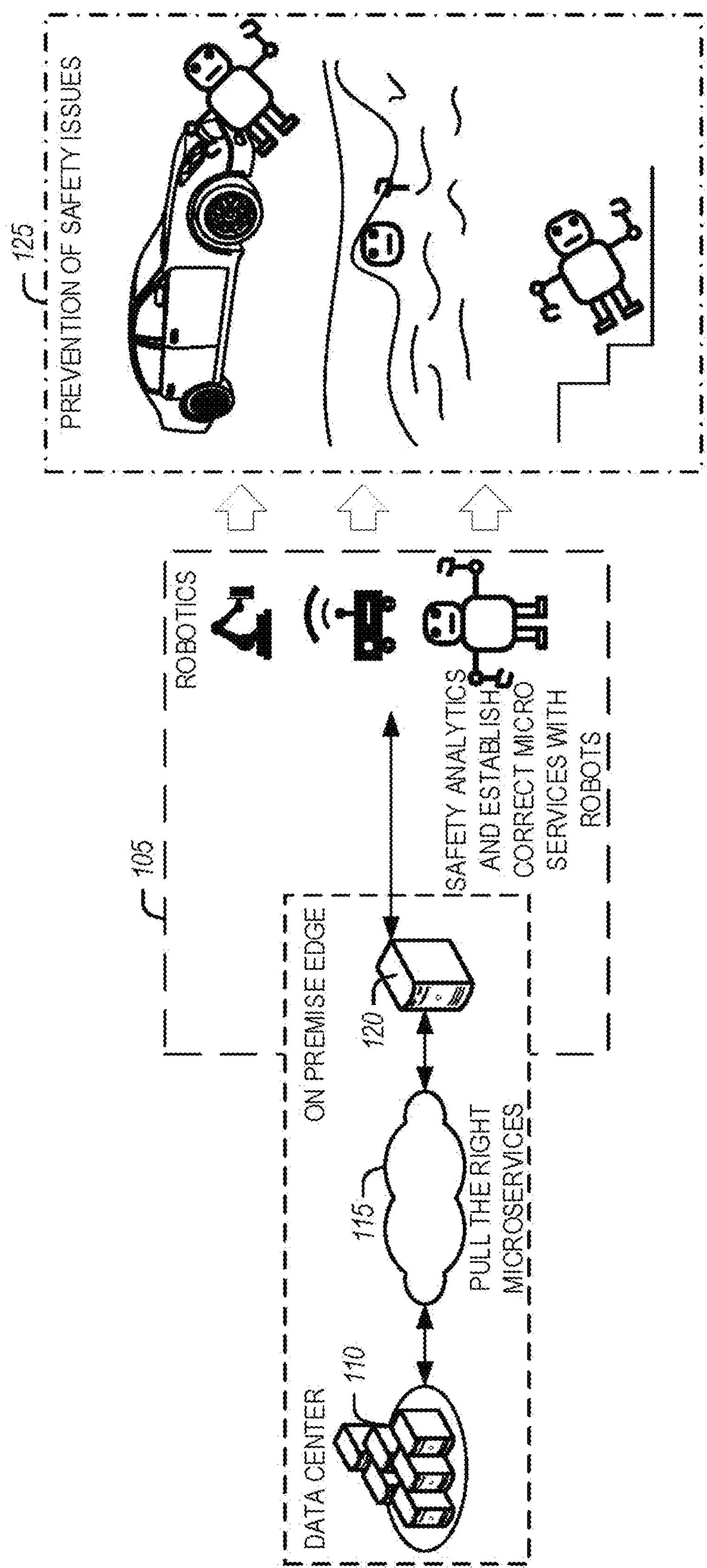
FIG. 1 is a block diagram of an example of an environment for reliable real-time deployment of robot safety updates, according to an embodiment.

Human-robot interaction plays an essential and important role in the deployment of robotics systems in our daily life such as in manufacturing, delivery, healthcare, and domestic services. However, every day, there are many unforeseen circumstances which could threaten human safety because robots are expected to react based on pre-defined safety measures.

For example, there could be a road safety issue. For example, a delivery robot may have crossed a street and stopped in the road suddenly forcing a car to come to a quick stop. The issue may be cause by an inability of the delivery robot to adapt to unexpected changes in road conditions in real-time. In another example, a warehouse robot may increase the risk of human injuries because the speed of the warehouse robot may be too fast for its human counterparts to keep up with under certain circumstances. Thus, robots with fixed configurations may be unable to adapt to human pace. The warehouse robot may lack intelligence to predict and react to the changes in human behavior or body conditions dynamically resulting in an increase in human injuries.

In yet another example, unpredictable environmental conditions (e.g., floods, fires, etc.) that arise during robot operation may result in robot damage. The robot may be unable to react mechanically during a disaster or other change in environmental conditions because of a lack of dynamic adaptability. Damage of the robot or an inability to adapt may cause safety issues for humans based on robot operation. In another example, a robot collision may be caused by a loss of coordination between a robot and another robot either in a warehouse or public space. A robot may be unable to reach an expected volume and may experience loss of control due to the loss of coordination.

Real-time deployment of a robot with intelligent microservices based on dynamical changes in unforeseen conditions may overcome these potential robot operational issues. Most of robot actions are preconfigured with fixed microservices for deployment. Microservice deployment to robots is often performed manually by an administrator when an upgrade or new microservices is needed for the robots. Existing robots are unable to comprehend and react to the changes in safety conditions in real-time under unforeseen conditions which cause safety issues. There is not a safety analytics mechanism to deploy the right safety microservices in real-time and make changes to robot operation dynamically based on changing conditions (e.g., changing wheel speed due to road conditions, etc.). There may not be intelligent and autonomous deployment of a robot without human intervention based on dynamically changing condition. This adds latency to addressing a safety hazard.

The systems and techniques discussed herein provide microservices deployment in real-time by reacting to unforeseen changes in safety conditions through intelligent deployment and autonomous identification of the correct safety microservices from an edge server to the robots. A microservice architecture splits a monomer (e.g., discrete, atomic, etc.) robot application into multiple safety services for faster deployment to a robot. For example, after the robot identifies a road condition change in real-time, the edge server may establish and deploy a safety microservice to address the condition change. For example, the edge server may update a safety route or safety remediation actions to the robot to prevent a road safety issue such as preventing a crash between the robot and a car.

Making a robot move, especially in a safe way requires complex software that typically consists of several separate components. Precautions are taken during development from unit tests at the component level up to integration tests at a system level to ensure that the overall system is working reliably. In a robotic context, as a lot of sensor data is required (e.g., from cameras, lidars, etc.) the testing is even more important. For example, a well-tested robot might not work correctly if the lighting in a room differs from the test environment. At first glance this in-the-field testing only needs to be done once during the initial setup and might therefore be seen as negligible. In-the-field testing is a recurring problem due to the complexity of software updates that are required during a lifetime of a robot.

The systems and techniques discussed herein improve the reliability of software updates/upgrades specifically for robots, by running the update/upgrade in parallel within an edge computing environment, and validating such update/upgrades by setting up specific test cases, even during normal task/mission execution. In contrast, current approaches such as failsafe software update systems (e.g., package-based, image-based, etc.) are commonly used for embedded devices, but provide limited capabilities. For example, robotic devices and robotic device networks may advertise over-the-air update capabilities. Also, research has been carried out in the area of in-mission updates. However, such previous approaches do not or have only partially considered the capabilities of edge computing for complex scenarios of testing and validation.

FIG. 1 is a block diagram of an example of an environment 100 for reliable real-time deployment of robot safety updates, according to an embodiment. The environment 100 includes real-time safety analytics and establishment of safety microservices 105 with robots. The microservices 115 that are determined to improve safe operation are pulled from a data center 110 by an on premises edge device 120 to prevent safety issues 125.

Real-time prediction of safety conditions correlates with changes in the environment to accurately identify the right safety microservices to deploy to a robot and to avoid safety issues. Correct safety prevention rules are dynamically and intelligently loaded for safety analysis to enable fast deployment of safety microservices to the robots to reduce safety risks. The edge device 120 is enhanced to provide better safety data to robots to reduce accidents. Safety workload in consolidated at the edge enabling multiple analytics and classifications improving processor performance and reduced latency. The systems and techniques discussed herein are applicable to a variety of edges or servers to improve robot safety functions providing increased safety of robot usage in the warehouse/factory or on the road leading to increased confidence levels for robots. Dynamic adaptation of services of a robot may increase a mechanical lifetime of the robot by reducing wear and tear caused by suboptimal robot operation.

Figure 2:
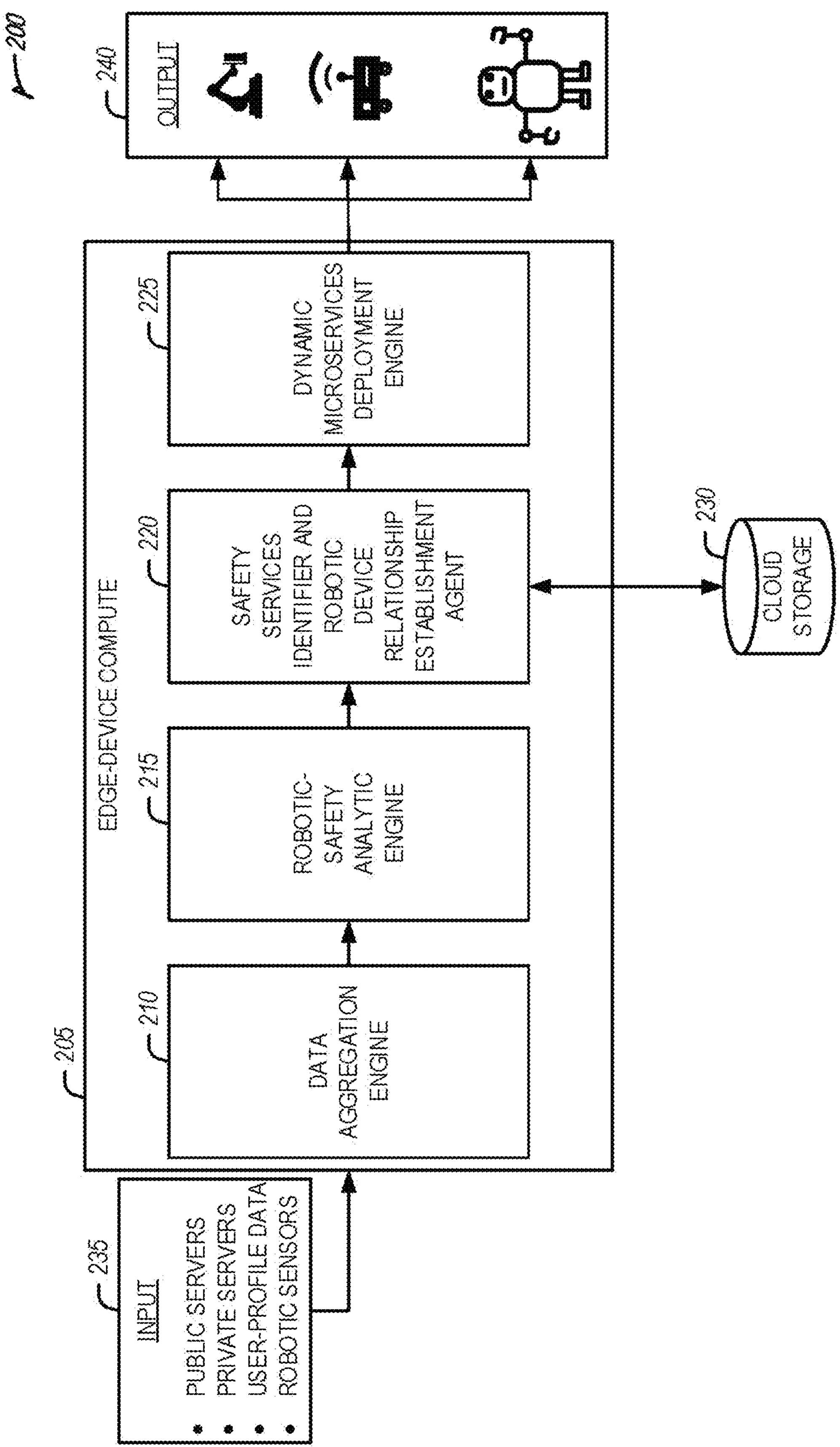
FIG. 2 is a block diagram of an example of a system for reliable real-time deployment of robot safety updates, according to an embodiment.

FIG. 2 is a block diagram of an example of a system 200 for reliable real-time deployment of robot safety updates, according to an embodiment. The system 200 may include an edge-device compute node 205. The edge-device compute node 205 may include a variety of components including a data aggregation engine 210, a robotic-safety analytic engine 215, a safety services identifier and robotic device relationship establishment agent 220, and a dynamic microservices deployment engine 225. The system 200 enables real-time deployment of robots with intelligent safety microservices to enable the robots to react to unforeseen changes in safety conditions.

The data aggregation engine 210 may utilize a smart data classification algorithm and a smart robot-data identification algorithm to collect data and associate data. The smart data classification algorithm classifies raw data collected from multiple sources (e.g. public data sources, private data source, etc.) or robots by a condition type (e.g., outdoor condition, indoor condition, user profile condition, robot condition, etc.). The condition types are encapsulated with relevant raw data for later use by robots.

Public data sources may provide a variety of data about conditions occurring in an environment in which a robot may be operating. In an example, data may be extracted from multiple public data sources such as a road traffic server that provides vital information such as road traffic jams, road construction, accidents, road closures, etc. that may be classified as outdoor conditions. In another example, location-based data sources may provide route direction, distance, and latest location landscape conditions such as flooding, etc. that may be classified as outdoor conditions. In yet another example, weather forecast data sources may provide live weather conditions such as heavy rain, hail, snow delay due to the harsh environmental factors, etc. that may be classified as outdoor conditions. In another example, public building data sources may provide vital information such as a number of people in a building, number of floors, number of escalators, etc. that may be classified as indoor conditions.

Private data sources may be accessed to collect user profile data used for human-robot interaction use-cases for warehouse robots, hospital robots, etc. In an example, worker user profile data may include name, gender, age, physical body size, health condition, etc. and may be classified as worker user profile conditions. In another example, hospital patient profile data may include name, room number, patient condition, etc. that may be classified as patient-user profile conditions. In yet another example, sensor data captured and upload from robots may be collected (e.g., conditions based data such as road condition, indoor environment condition, etc.) and may be classified as robot conditions.

The smart robot-data identification algorithm identifies which type of robots (e.g., warehouse robots, delivery robots, hospital robots, surveillance robots, police robots, etc.) that match and are associated with the condition types of the data that has been classified by the smart data classification algorithm.

Figure 3:
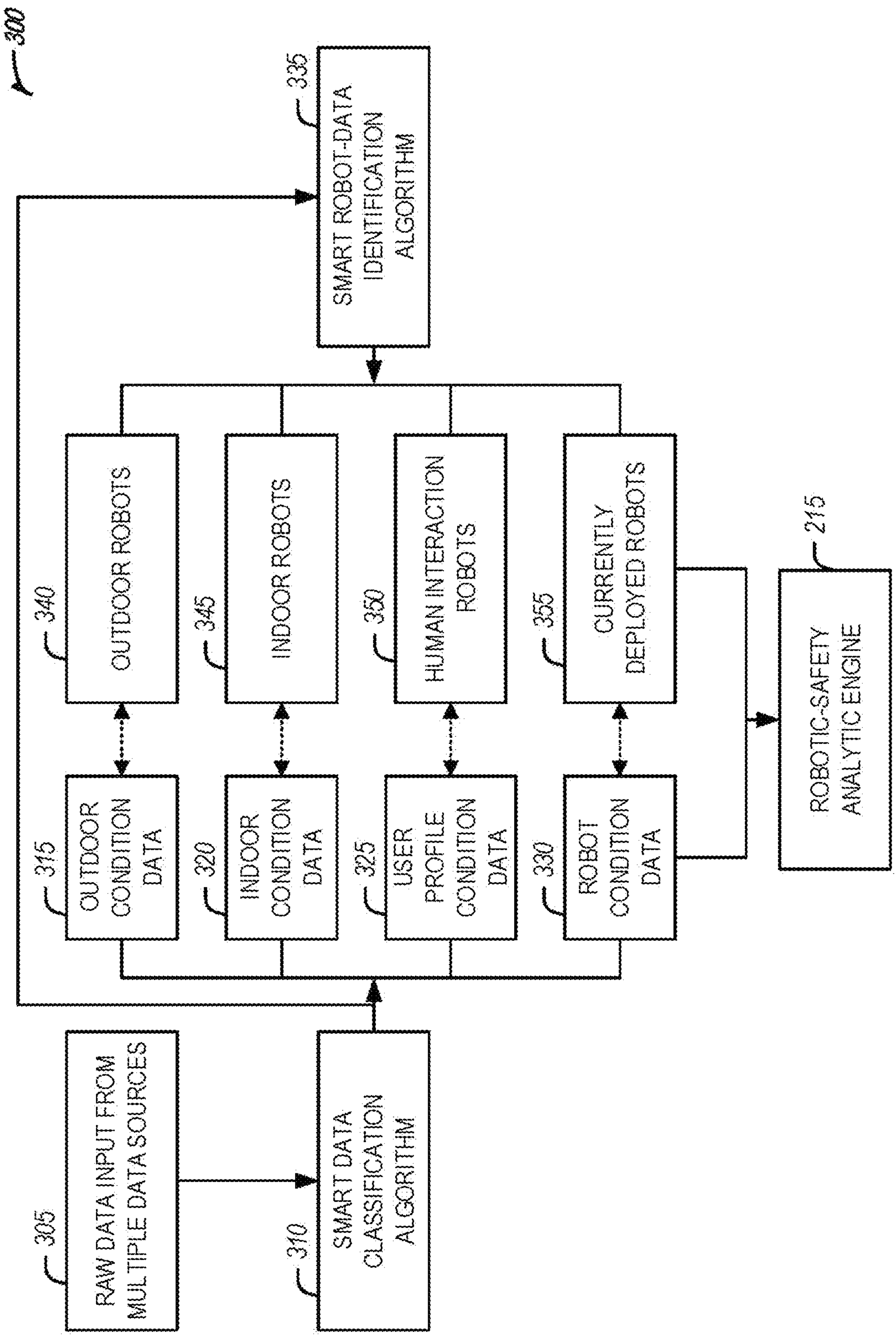
FIG. 3 illustrates a data flow diagram of an example of data flow for a data aggregation engine for reliable real-time deployment of robot safety updates, according to an embodiment.

FIG. 3 illustrates a data flow diagram of an example of data flow 300 for a data aggregation engine for reliable real-time deployment of robot safety updates, according to an embodiment. Raw data inputs are gathered from multiple data sources such as public servers, private servers that provide user profile databases, or sensor data from robots (e.g., at operation 305). The data sources may be configured by an administrator. Profile data may be accessed based on a user opting to release data for use in improving robot safety.

The raw data may be classified by a smart data classification algorithm (e.g., at operation 310). The data may be classified into a variety of condition data types such as outdoor condition data 315 (e.g., weather, road conditions, etc.), indoor condition data 320 (e.g., temperature, building layout, floors, ceiling heights, floor surface configuration, etc.), user profile condition data 325 (e.g., information about humans interacting with robots, etc.), and robot condition data 330 (e.g., conditions experienced by a robot (e.g., collected from sensors included with the robot, etc.)).

A smart robot-data identification algorithm may identify robots that may be operating under the various condition types. For example, outdoor robots 340 may be identified and associated with the outdoor condition data 315, indoor robots 345 may be identified and associated with the indoor condition data 320, human interaction robots 350 may be identified and associated with the user profile condition data, and currently deployed robots 355 may be identified and associated with the robot condition data 330.

Returning to the description of FIG. 2, when the robots and robot types have been identified and associated with the condition type data by the data aggregation engine 210, the data is provided as input to the robotic-safety analytic engine 215.

The robotic-safety analytic engine 215 is uses a safety prevention classifier process that analyzes and generates a safety prevention model. The safety prevention model may be used by the safety services identifier and robotic device relationship establishment agent 220.

Figure 4:
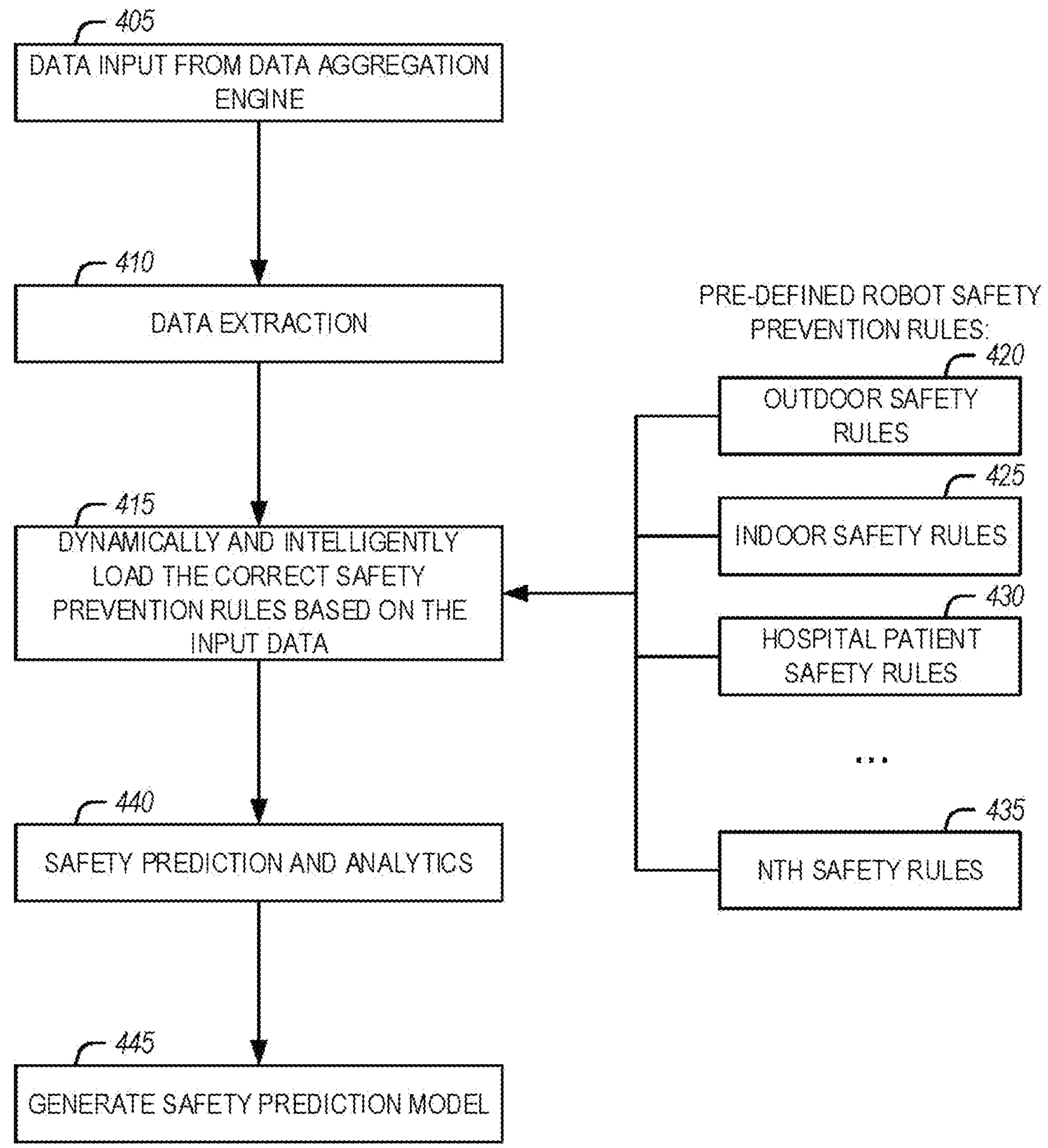
FIG. 4 illustrates a data flow diagram of an example of data flow for a robotic-safety analytic engine for reliable real-time deployment of robot safety updates, according to an embodiment.

FIG. 4 illustrates a data flow diagram of an example of data flow 400 for a robotic-safety analytic engine for reliable real-time deployment of robot safety updates, according to an embodiment.

Information is received from the data aggregation engine 210 (e.g., at operation 405). The information contains the associations for conditions data with types of robotics. For example outdoor condition data contains the weather condition, road condition, location landscape condition associated with delivery robots. Private user profile condition contains warehouse worker name/ID, gender, age, physical body size, a health condition, etc. associated with a warehouse robot. The received data is extracted (e.g., at operation 410). Based on the information extraction (data conditions and type of robots), safety analysis dynamically and intelligently loads correct safety prevention rules for analysis (e.g., at operation 415).

Safety prevention rules may be pre-defined for a variety of environments such as, by way of example and not limitation, outdoor safety rules 420, indoor safety rules 425, hospital patient safety rules 430, up to and including Nth safety rules 435. For example, if the data is outdoor conditions associated with delivery robots, the system will load outdoor safety rules 420. If the data is related to warehouse workers associated with warehouse robots warehouse worker safety rules may be loaded dynamically and intelligently.). The safety prevention rules are pre-defined with detailed safety rules that are encapsulated into metadata format. The safety prevention rules contain predefined safety precaution rules and the actions that need to be handled for specific safety conditions based on the robot types that have been assigned. The safety prevention rules are used to perform safety prediction and analytics.

In an example, sample metadata of Outdoor Safety Rules is shown in Table 1.

TABLE 1

[{**Outdoor Condition}+{weather prevention rules(included:- clear sky; heavy-rain; thunderstorm; snow, etc.)}+{road prevention rules(included:- highway, bumpy road, etc.} +{Vehicle's distance rules(van, car, truck, etc.)}+ {Human's interaction rules},...]

A safety risk level is predicted and classified by a safety prediction and analytic process using the input conditions data and robot types assigned and is calculated based on the safety prevention rules (e.g., at operation 440). The safety risk level is based on the sum of unforeseen safety conditions, for example:

The safety risk level is defined by a number (n_i) of risk factors, r_i, and each risk factor will have its own risk weightage, α_i, which can be tuned according to conditions.

$$\text{Safety\_Risk\_Level} = \sum_{i=1 \ldots n} \alpha_i r_i$$

Categories for the safety risk levels may, for example, be between 1 to 3: 1=Low safety risk level, 2=Mid safety risk level, 3=High safety risk level. For example, if the weather now is heavy rain and road traffic conditions are very congested for delivery robots, the safety risk level is 3. If the weather now is sunshine and road traffic conditions are normal for the delivery robot, the safety risk level is 1. The safety analytics may handle and analyze real-time data (e.g., sensor data, etc.) that is pushed by the robots. For example, if real-time road conditions change from normal road to slippery road, the safety risk level may need to be immediately updated and the robot may have to take safety precaution actions immediately.

When the safety risk level has been determined, a safety prediction model is generated (e.g., at operation 445). For example, a safety prediction model for a delivery robot experiencing a change from a normal road to a slippery road may be structured as shown in Table 2.

TABLE 2

Delivery robot on road =[{Delivery Robot_x};{safety level=0};{safety prevention services=(normal)}
  While change to slippery road = [{Delivery
  Robot_x}; {safetylevel=3}; {safety_prevention_services=(
  slippery_wheel_control,object_distance_control,
brake_control, alert_control, *other safety services)}

Returning to the description of FIG. 2, the safety prediction model is encapsulated with the safety prevention services and is used use by the safety services identifier and robotic device relationship establishment agent 220. The safety services identifier and robotic device relationship establishment agent 220 may identify safety microservices and may establish a relationship with a robotics flow.

Figure 5:
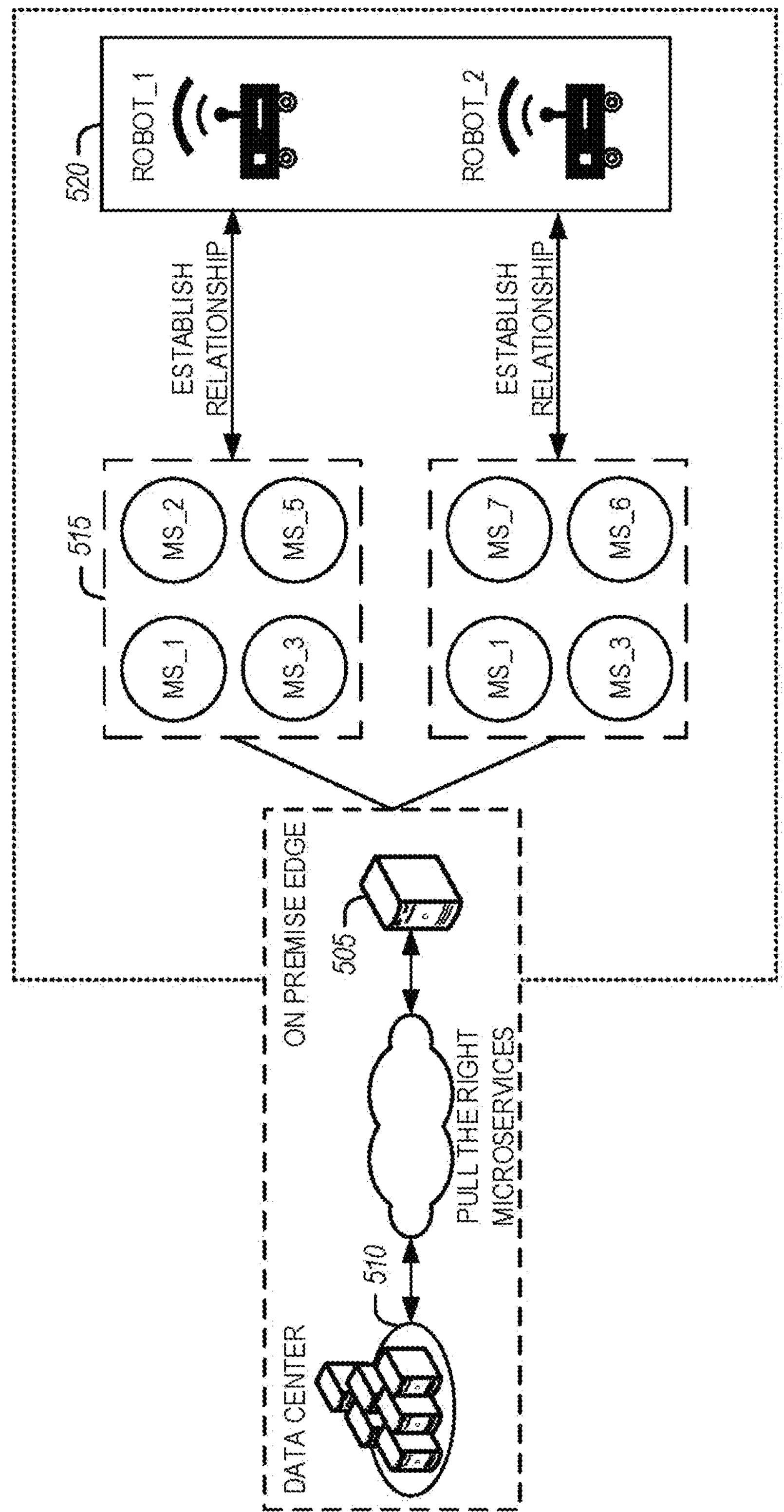
FIG. 5 illustrates an example of identification of safety microservices and relationship establishment with robotics flow for reliable real-time deployment of robot safety updates, according to an embodiment.

FIG. 5 illustrates an example of identification of safety microservices and relationship establishment with robotics flow 500 for reliable real-time deployment of robot safety updates, according to an embodiment. Utilizing the safety prediction model generated from the robotic-safety analytic engine 215, safety microservices 515 are identified and a relationship is established with the robots 520. Communication is established between the on premises edge device 505 and multiple backend cloud servers 510 to pull the right safety services and build up the microservices 515 for the robots 520.

Figure 6:
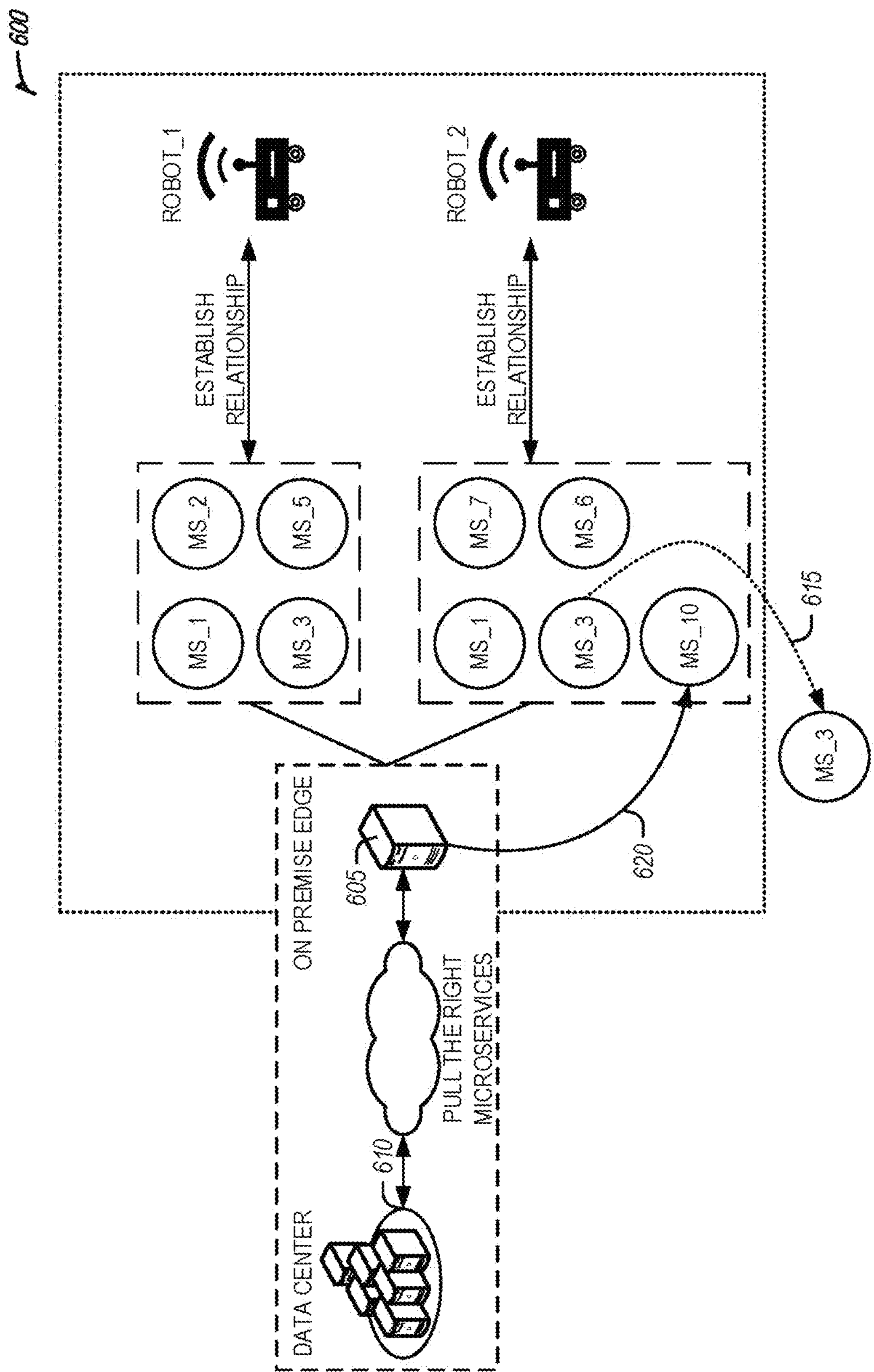
FIG. 6 illustrates an example of real-time identification and update of safety microservices based on a safety risk level change for reliable real-time deployment of robot safety updates, according to an embodiment.

FIG. 6 illustrates an example of real-time identification and update of safety microservices based on a safety risk level change 600 for reliable real-time deployment of robot safety updates, according to an embodiment. Services are pulled by the on premise edge device 605 from multiple backend cloud servers 610. When a safety risk level is identified, a microservice may be removed at 615 and replaced with an alternate microservice 620 to address the safety risk level based on analysis of current conditions. For example, the weather condition may change from a normal road to a slippery road based on a data push from a robot that cause the potential for a safety issue.

The on premise edge device 605 may receive real-time data from the delivery robots via the robotic-safety analytic engine 215. The road conditions change from normal to slippery roads and the safety risk level is updated according to the safety prediction model and encapsulated with the right safety services.

The on premise edge device 605 communicates and accesses the multiple backend cloud servers 610 to pull the right safety services based on the safety prediction model. The microservice MS_3 is a microservice that provides robot instructions for safe operation on normal road conditions. And the MS_10 microservice is a microservice that works in slippery road conditions. The microservices are updated seamlessly based on dynamic changes to the safety risk level by replacing MS_3 at 615 with MS_10 at 620 when the safety risk level increases due to degraded road conditions. The right safety services are selected for deployment based on the safety risk level and safety prediction model based on conditions and a relationship is established with the right robot to deploy the appropriate microservices.

Returning to the description of FIG. 2, the dynamically deployment engine 225 supports real-time deployment of the right microservices to the right robots. The dynamically deployment engine 225 monitors (e.g., continuously, periodically, etc.) the safety risk level status from the robotic-safety analytic engine 215.

Figure 7:
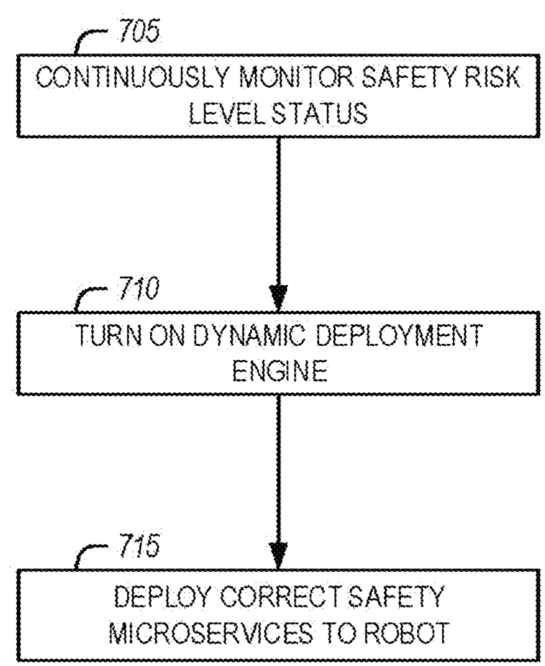
FIG. 7 illustrates a data flow diagram of an example of data flow for a dynamic deployment engine for reliable real-time deployment of robot safety updates, according to an embodiment.

FIG. 7 illustrates a data flow diagram of an example of data flow 700 for a dynamic deployment engine 225 for reliable real-time deployment of robot safety updates, according to an embodiment. The safety risk level status is continuously monitored (e.g., at operation 705). When a safety risk level status change is detected, the deployment channels are made ready by turning on the dynamic deployment engine (e.g., at operation 710). For example, a fifth generation cellular network (5G) or long range wide area network (LoRaWan) communication channel, etc. may be opened that may communicate with the robots. The dynamic deployment engine 225 coordinate with the safety services identifier and robotic device relationship establishment agent 220 to deploy the right safety microservices to robots (e.g., at operation 715).

The systems and techniques discussed herein perform software updates while considering parallel an in-the-field test phase and comparison of new and established components. The systems and techniques discussed herein use a distributed approach of execution (e.g., edge vs. embedded, etc.) and automatic test case creation and execution to validate adaptions in a real world environment that considers configurations that are not expected or rarely expected in a current manufacturing setup. The reliable approach to robotic software updates using in-parallel execution of components for testing enables testing during normal task/mission execution and reduces costs due to reduced downtime during updates.

Figure 8:
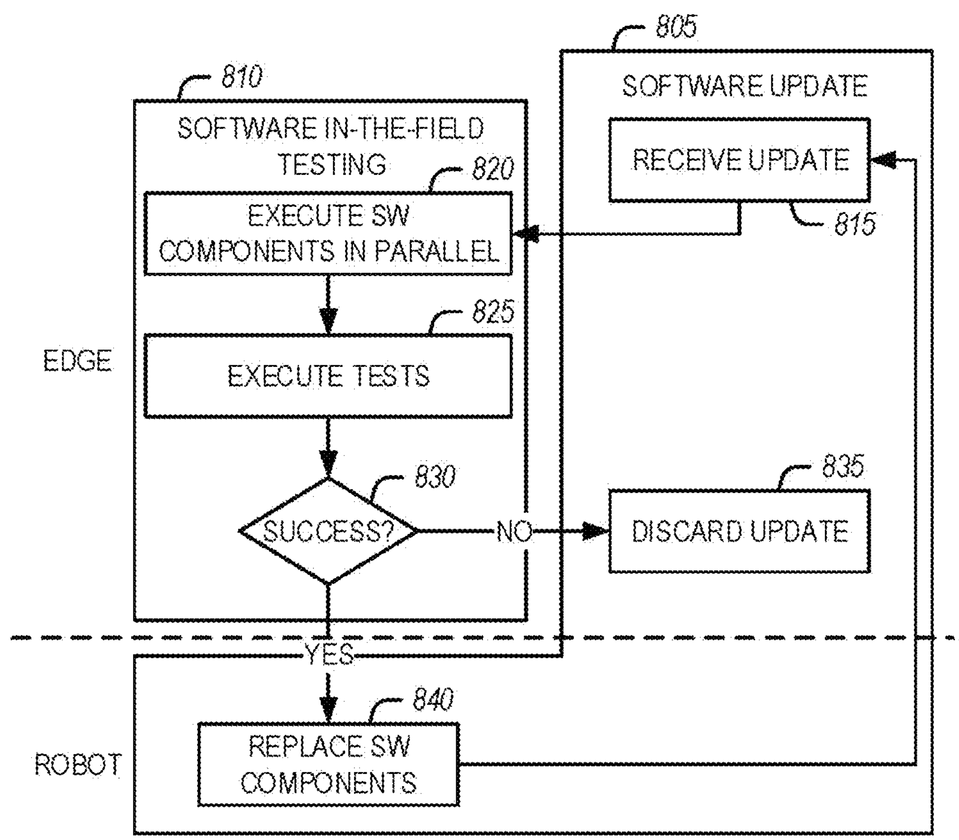
FIG. 8 illustrates an example of update execution and responsible stakeholders for reliable real-time deployment of robot safety updates, according to an embodiment.

FIG. 8 illustrates an example of update execution 800 and responsible stakeholders (software update 805 and software in-the-field testing 810) for reliable real-time deployment of robot safety updates, according to an embodiment. The software update (SU) 805 receives an update package (e.g., via 5G, Wi-Fi, etc., such as at operation 815). The software in-the-field testing (ST) 810 is notified by the SU and takes over the in-the-field testing by executing (e.g., at operation 820) the updated software component (SC) (e.g., an updated executable, changed parameters or a new version of an artificial intelligence (AI) model, etc.) in an encapsulated way and executing a test (e.g., at operation 825). The result of the test module (e.g., determined at decision 830) is reported back to the SU 805, that either discards the update (e.g., at operation 835) or finishes the update deployment by replacing the old SW components (e.g., at operation 840). The SU 805 and ST 810 represent a distributed system that is partially located in the edge/cloud executing on an on premise edge device and partially on a robot. A robot-only approach may be possible to provide a limited feature set.

The SU 805 may be executing in an edge to receive update packages and provide them to the ST 810. The origin of the update packages may be varied. In an example, an update package may be provided via internet/cloud (e.g. by a robot manufacturer, from an integration service provider, introduced locally (e.g. by a service worker, etc.)). When an update package is available, the SU 805 verifies that the content is valid, correctly signed, and that a corresponding robot is existing and available. The SU 805 may be used by one or multiple robots. An SU 805 client may be deployed and executing on the robot. If an update was verified by the ST 810, the package is transferred to the robot and installed on the robot in a fail-safe and reliable way. A variety of deployment approaches may be used for ultimate deployment of the update to the robot. A result is then sent to the on premise edge device SU 805. The process is logged and the log may be provided to experts for further analysis.

Figure 9:
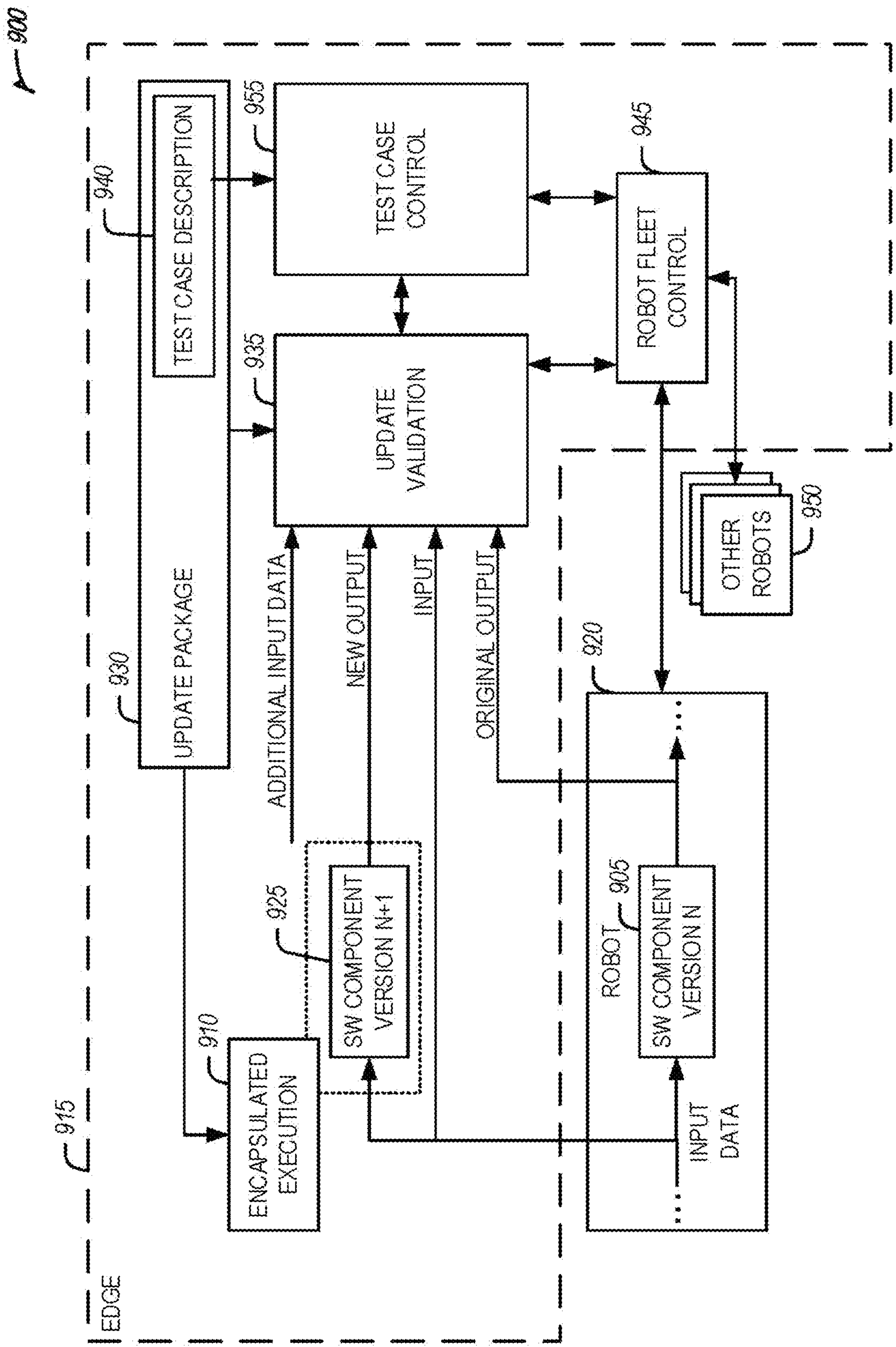
FIG. 9 illustrates a data flow diagram of an example data flow for software in-the-field testing for reliable real-time deployment of robot safety updates, according to an embodiment.

The ST 810 may be executing in the edge on an on premise edge device and communicates with one or multiple robots (e.g., via 5G, Wi-Fi, etc.) to test updates. It consists of multiple functional units that are illustrated in FIG. 9. Whenever the SU provides an update package the content is parsed. For each robot to update an in-the-field test procedure is triggered. If more than one of the same robot type is existing in an environment it can be chosen if all robots must successfully finish the ST or only one. It is even possible that the deployment only gets executed if all robots of a type report a successful test.

FIG. 9 illustrates a data flow diagram of an example data flow 900 for software in-the-field testing for reliable real-time deployment of robot safety updates, according to an embodiment. It is identified which software component (SC) 905 is being updated. It is possible that multiple software components are being updated at once. The update software components 925 are executed within an encapsulated container 910 within an edge compute node 915. The encapsulation may be achieved using hardware or operating system-level (OS-level) virtualization. The selected approach is dependent on a robot-type (e.g., based on computer architecture, etc.) of a robot 920 and is known by the ST in advance. If multiple robots 920 receive an update, multiple containers 910 are created. The input data streams of the software components are identified on the robot 920 and are forwarded towards the encapsulated software components 925 in the edge compute node 915 via a network (e.g., 5G, Wi-Fi, etc.). By analyzing the data rate beforehand it is possible to estimate if an edge-based execution is possible. If not, either a robot-only ST is used or delayed testing is done by first collecting data on the robot 920 for a defined timespan and then testing at the edge compute node 915 afterwards. Instead of an update to a single software component, an update of the entire robot 920 software stack may be executed in an encapsulated container 910.

Update validation (UV) 935 tests the update software component 925 and creates meaningful information about the quality of a new feature/bugfix. The relevant in-the-field tests 940 are either specified for each SC in general or might be provided with the update package 930 itself. It may contain regression tests that are executed in order to ensure existing features to remain functional. If delivered with the update package 930 the tests 940 may contain a description of the expected output data (e.g., for specific input data).

An example approach compares output of the update with the original. Therefore, the original output from the software components 905 running on the robot is forwarded to the UV 935. As time delays may be different due to the involved network communication, the original output may be transmitted to the UV 935 together with the corresponding input. That allows the UV 935 to compare the output of the update software components 925 in the encapsulated container 910 for a specific input (e.g., with a certain timestamp). Another validation approach is to determine the output of the update software components 925 by processing the input data within the UV 935 itself in order to predict the output of the update software components 925. Intermediate results may be compared within the update software components 925.

In certain cases, a more sophisticated UV 935 is used. For example, for perception-related software components, a simple comparison might not be sufficient for validating the update package 930. In those cases, the UV 935 may receive additional input data. This may be data from edge-based sensors (e.g., cameras, lidars, etc.) or even preprocessed data (e.g., from an edge-based perception (e.g., object lists, occupancy grids)). By incorporating the additional information, a validation may be easier to determine. For example, if the update software components 925 are an object detection module, the edge-based perception may provide a list of objects to compare. Similarly, the UV 935 may communicate with an edge-based robot fleet control 945 in order to receive information of other robots 950 which may be used for validation.

While the previous validation methods are passive, only comparing data, there are also active approaches. For that a test case control (TCC) 955 may be used to influence the behavior of the robot 920 and thereby trigger certain test scenarios. The UV 935 is then able to validate the functionality by comparing the difference to a previous version or any defined state provided by the update package 930. For example, an update of parameters of a certain maneuver may be tested by bringing the robot 920 in such a situation. If the perception system was updated to enable the detection of special situations (e.g., "green" boxes, etc.) that were not detectable before, the robot 920 may be presented with a special situations. The TCC 955 is also able to request certain behaviors of other robots by communicating with the robot fleet control 945.

The TCC 955 communicates with the robot fleet control 945 and the update validation 935. If the update package 930 contains test case descriptions 940, the TCC 955 will receive those from the update validation 935. The test case descriptions 940 define certain test scenarios that include the robot 920 under test and might also include other robots 950 or actuators in the environment. They also specify abort criterions that may be used to determine that the update software components 925 do not react correctly and that the test needs to be stopped to avoid harm or damage. The test case descriptions 940 may either be generic and the TCC 955 may need to calculate a plan to execute in the actual environment, or the plan may already be location specific.

The TCC 955 will automatically check if the robot fleet control 945 is able to command the scenario. For example, by guiding robots to a specific location to get the desired test scenario for the robot 920 pr placing a specific object at a certain location to see if the robot 920 under test performs the expected action.

If creation of the desired test scenario is not directly possible (e.g., because testing involves human behavior, an object is not available or known, etc.), the TCC 955 will communicate that with a human operator of the system and request to arrange the desired situation. If this is done, the operator may start test execution manually. The communication may happen using a computer terminal or more advanced audio/visual interfaces like augmented reality glasses, goggles, or face shields. In an example, tests may not be triggered automatically, but only if approved by the operator.

While the previously described test case execution may use a special testing phase in which robots are not following their usual mission (e.g., delivering items, etc.), the TCC 955 is able to adapt plans of the robot 920 during its common work mission. Downtime/setup time reduces the output and therefore raises costs. Thus, the tests may be executed during runtime. For example, to test new safety parameters the robot 920 may be ordered to follow a trajectory that brings it closer to an object. To be able to achieve that the TCC 955 receives the relevant mission information from the robot fleet control 945 or directly from the robot 920. By specifying a maximum additionally allowed time (e.g., 5% more time for testing, etc.) the TCC 955 may calculate which additional actions may be triggered during normal operation. This could, for example, be used to calculate the maximum deviation from a planned route in order to test the behavior of the robot 920. Another example is that the robot 920 may use this time to navigate somewhere or place an object at a certain position (e.g., to test a perception update, etc.). More sophisticated definitions of a maximum testing time during runtime may be created by calculating a cost/output factor of specific robots and defining testing time per robot.

Instead of single software updates, an update of the full robot 920 software system is possible. Therefore, the update software components 925 is executed in the same encapsulated approach. The input from sensors is received from the robot 920 and the control commands towards the actuators may be compared. By using a digital representation of the environment that incorporates the behavior of the other robots 950 (and humans) and assumes a certain future behavior model, it is possible to validate the updated behavior.

While edge-based software in-the-field testing may have many advantages, testing on the robot 920 itself where the encapsulated update software components 925 are running beside the original software component (SC) 905 may enable precise validation as network latency is not involved with a trade-off of utilizing additional computational resources.

The systems and techniques discussed herein enable the ability to execute and test components while they are under development in-the-field. By adding a special flag to the update package 930, deployment after in-the-field testing may be skipped to allow developers and system integrators to test the update software components 925 without installing them. Validating the tests themselves is possible using this approach. If multiple potential release candidates are available, they may be executed in parallel in order to identify the most reliable (e.g., different versions of an AI model, etc.)

Figure 10:
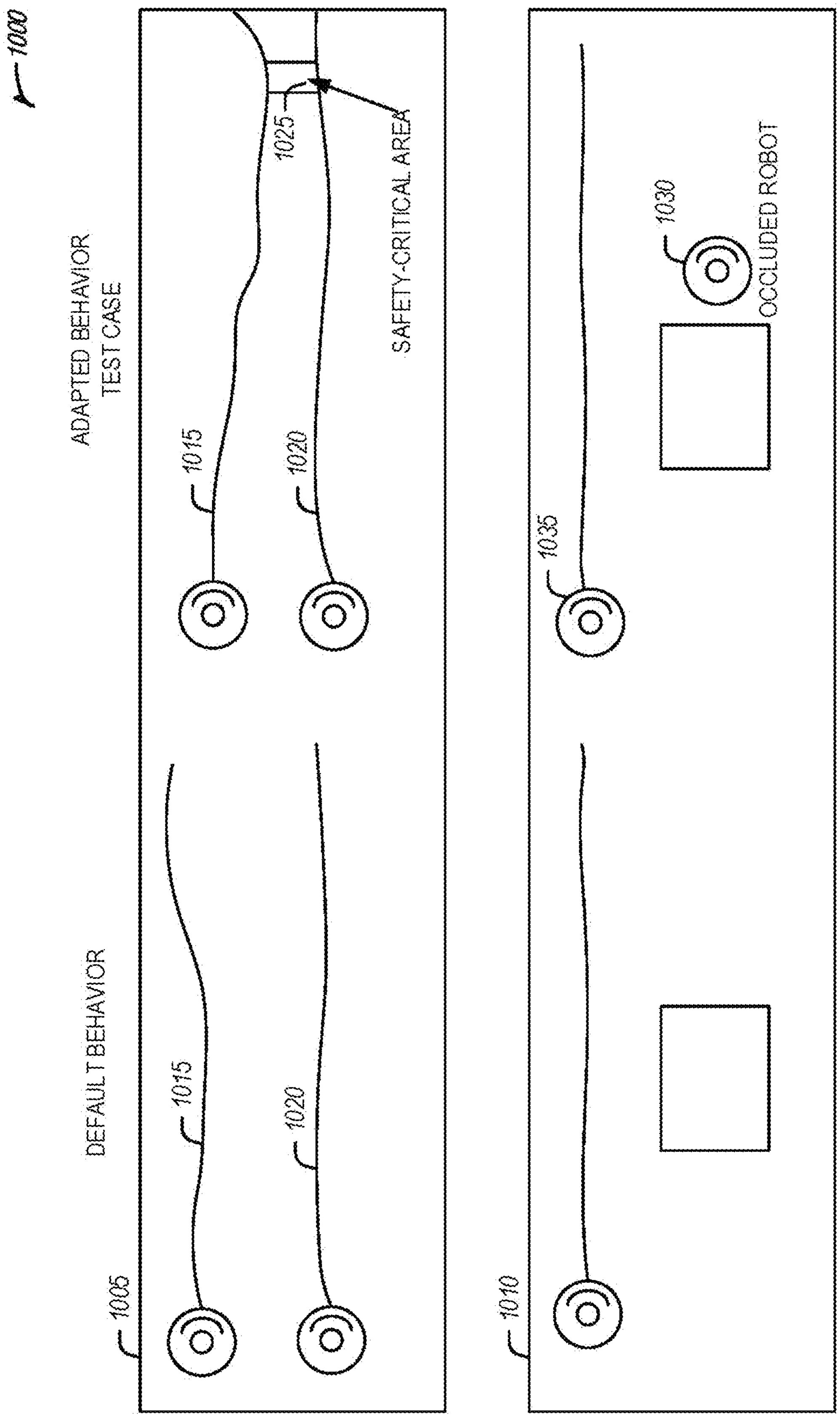
FIG. 10 illustrates examples of adaptation of default robot behavior in order to trigger a test case for reliable real-time deployment of robot safety updates, according to an embodiment.

FIG. 10 illustrates examples 1000 of adaptation of default robot behavior in order to trigger a test case for reliable real-time deployment of robot safety updates, according to an embodiment. In a first test case 1005, a first trajectory 1015 moves closer towards a second trajectory 1020 causing a safety-critical event 1025. In a second test case 1010, by ordering a second robot 1030 to wait within an occluded area while valid behavior after an update is tested for a first robot 1035.

Figure 11:
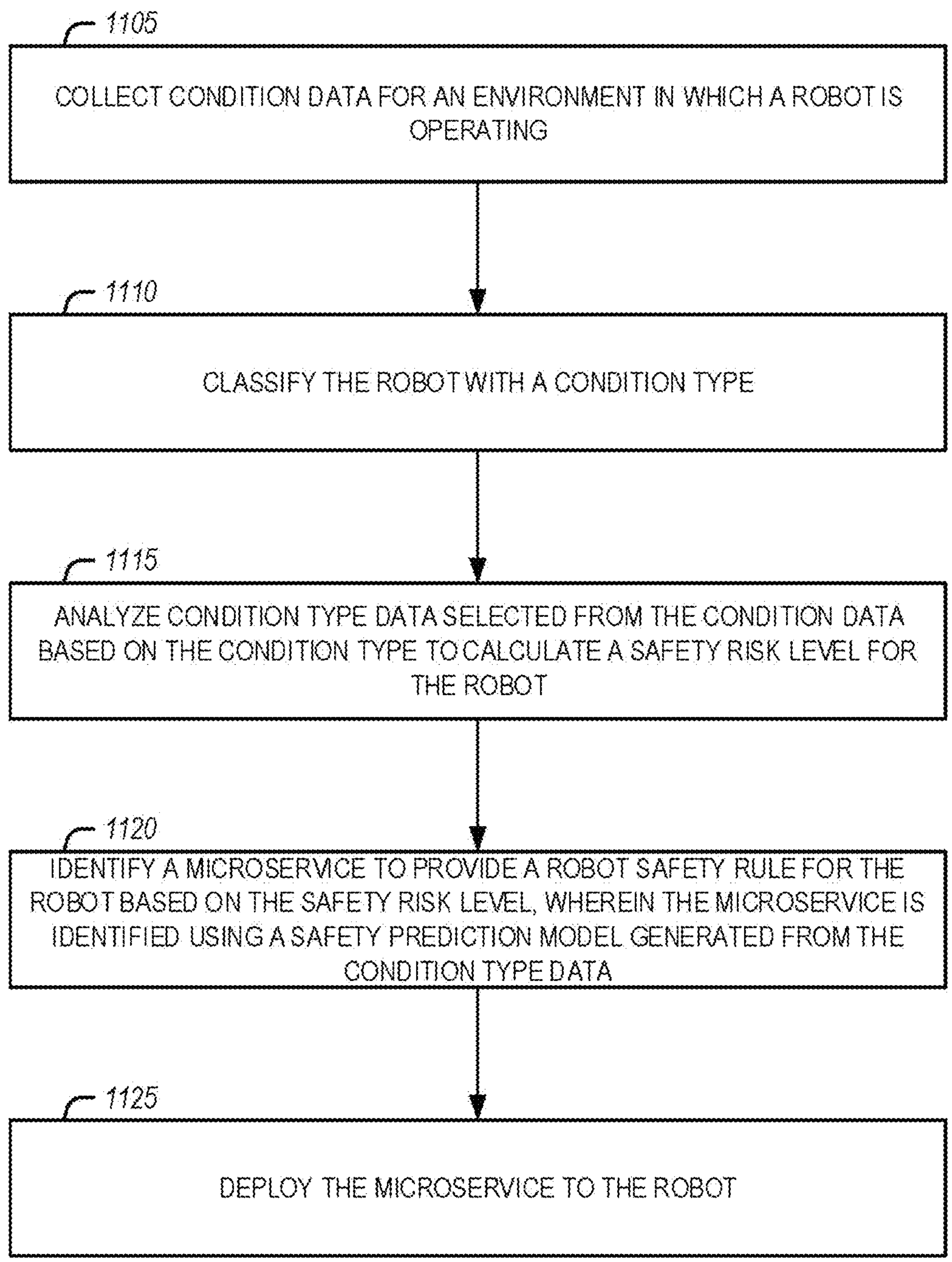
FIG. 11 is a flowchart of an example of a method for real-time robot microservice deployment for reliable real-time deployment of robot safety updates, according to an embodiment.

FIG. 11 is a flowchart of an example of a method 1100 for real-time robot microservice deployment for reliable real-time deployment of robot safety updates, according to an embodiment. The method 1100 may provide features as described in FIGS. 1-10.

Condition data may be collected (e.g., by the data aggregation engine 210 as described in FIG. 2, etc.) for an environment in which a robot is operating (e.g., at operation 1105). In an example, the condition data may be collected from a public condition data source that includes outdoor environmental conditions. In another example, the condition data may be collected from a public condition data source that includes indoor environmental conditions. In yet another example, the condition data may be collected from a private condition data source that includes profile data a human-robot interaction. In another example, the condition data may be collected from a sensor of the robot that includes robot environmental conditions.

The robot may be classified (e.g., by the safety services identifier and robotic device relationship establishment agent 220 as described in FIG. 2, etc.) with a condition type (e.g., at operation 1110)

Condition type data selected from the condition data may be analyzed (e.g., by the robotic-safety analytic engine 215 as described in FIG. 2, etc.) based on the condition type to calculate a safety risk level for the robot (e.g., at operation 1115). In an example, a current robot safety rule may be identified for the robot. Risk factors may be determined for the current robot safety rule using the condition type data. Weights may be applied to the risk factors to generate weighted risk factor values and the weighted risk factor values may be summed to create a risk factor sum. The safety risk level may be calculated by determining placement of the risk factor sum in a set of safety risk level thresholds.

A microservice may be identified (e.g., by the safety services identifier and robotic device relationship establishment agent 220 as described in FIG. 2, etc.) to provide a robot safety rule for the robot based on the safety risk level, wherein the microservice is identified using a safety prediction model generated from the condition type data (e.g., at operation 1120). In an example, a cloud repository of safety services may be accessed. A safety service may be identified from the cloud repository that will reduce the safety risk level and the microservice may be generated for the identified safety service.

The microservice may be deployed (e.g., by the dynamic microservice deployment engine 225 as described in FIG. 2, etc.) to the robot (e.g., at operation 1125). In an example, the microservice may be deployed by an on premise edge compute node. In an example, a relationship may be established between the on premise edge compute node and the robot. A microservice repository may be generated for the robot based on the relationship and the microservice may be added to the microservice repository. The microservice may be deployed to the robot using the microservice repository. In an example, it may be determined that a current microservice is unable to reduce the safety risk level and the current microservice may be removed from the microservice repository.

Figure 12:
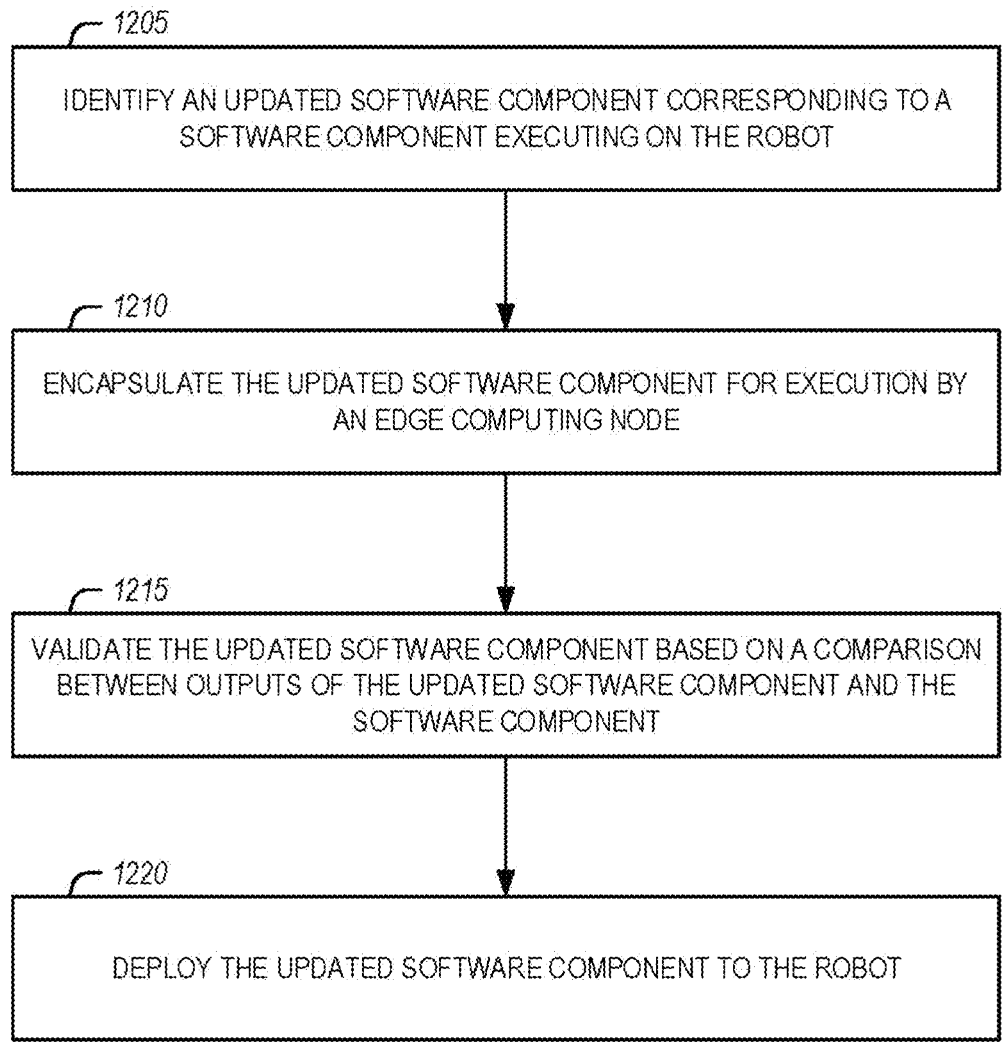
FIG. 12 is a flowchart of an example of a method for highly reliable robot software update deployment for reliable real-time deployment of robot safety updates, according to an embodiment.

FIG. 12 is a flowchart of an example of a method 1200 for highly reliable robot software update deployment for reliable real-time deployment of robot safety updates, according to an embodiment. The method 1200 may provide features as described in FIGS. 1-11.

An updated software component may be identified that corresponds to a software component executing on a robot (e.g., at operation 1205). The updated software component may be encapsulated for execution by an edge computing node (e.g., at operation 1210). In an example, encapsulation of the updated software component may include generation of an encapsulation container for the updated software component. In an example, a robot type may be identified for the robot and the encapsulated container may be generated using hardware virtualization or operating system virtualization based on the robot type.

The updated software component may be validated based on a comparison between outputs of the updated software component and the software component (e.g., at operation 1215). In an example, the updated software component may be obtained from a software update package that includes a test case description. Instructions may be transmitted to a robot fleet control to initiate control of the robot according to the test case description and expected outputs of the updated software component may be determined based on the test case description. Validation of the updated software component may include comparing the outputs of the updated software component to the expected outputs. In an example, validation inputs may be obtained from other robots and validation of the updated software component may include evaluation of the validation inputs to determine that the robot is operating correctly using the updated software component.

In another example, a message may be transmitted to a human operator to request an environmental change to facilitate a testing scenario. Upon receipt of a response to the message that indicates that the environmental change has been made, control instructions may be transmitted to the robot to complete the testing scenario and output may be received from sensors of the robot Validation of the updated software component may include evaluation of the received output to determine if the received output is within range of expected output values for the updated software component.

In yet another example, a testing variation time value may be calculated based on a current workload of the robot. It may be determined that completion time for a test scenario is lower than the testing time variation value. A robot control message may be transmitted to the robot to use the updated software component to execute the test scenario and output may be received from the robot upon completion of the test scenario. Validation of the updated software component may include evaluation of the received output to determine if the received output is within range of expected output values for the updated software component.

The updated software component may be deployed to the robot upon validation of the updated software component (e.g., at operation 1220).

Figure 13:
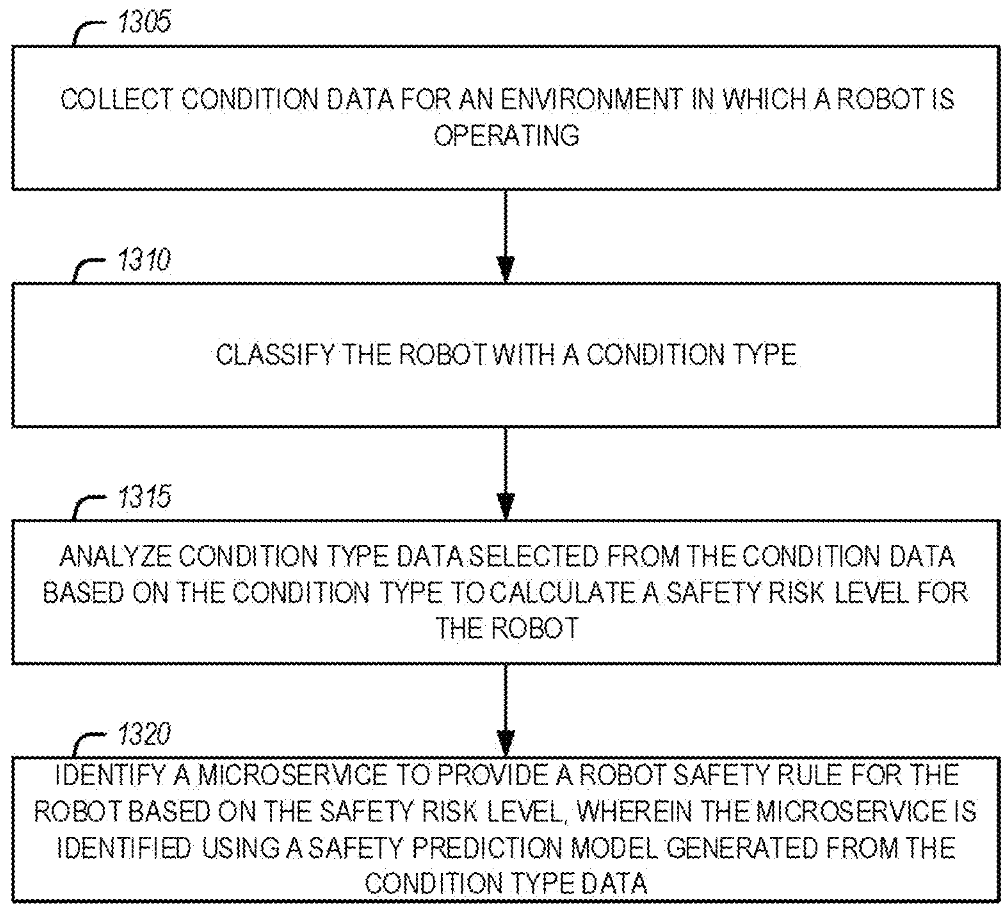
FIG. 13 is a flowchart of an example of a method for reliable real-time deployment of robot safety updates, according to an embodiment.

FIG. 13 is a flowchart of an example of a method 1300 for reliable real-time deployment of robot safety updates, according to an embodiment. The method 1300 may provide features as described in FIG. 1-12.

Condition data may be collected (e.g., by the data aggregation engine 210 as described in FIG. 2, etc.) for an environment in which a robot is operating (e.g., at operation 1305). In an example, the condition data may be collected from a public condition data source that includes outdoor environmental conditions. In another example, the condition data may be collected from a public condition data source that includes indoor environmental conditions. In yet another example, the condition data may be collected from a private condition data source that includes profile data a human-robot interaction. In another example, the condition data may be collected from a sensor of the robot that includes robot environmental conditions.

The robot may be classified (e.g., by the safety services identifier and robotic device relationship establishment agent 220 as described in FIG. 2, etc.) with a condition type (e.g., at operation 1310)

Condition type data selected from the condition data may be analyzed (e.g., by the robotic-safety analytic engine 215 as described in FIG. 2, etc.) based on the condition type to calculate a safety risk level for the robot (e.g., at operation 1315). In an example, a current robot safety rule may be identified for the robot. Risk factors may be determined for the current robot safety rule using the condition type data. Weights may be applied to the risk factors to generate weighted risk factor values and the weighted risk factor values may be summed to create a risk factor sum. The safety risk level may be calculated by determining placement of the risk factor sum in a set of safety risk level thresholds.

A microservice may be identified (e.g., by the safety services identifier and robotic device relationship establishment agent 220 as described in FIG. 2, etc.) to provide a robot safety rule for the robot based on the safety risk level, wherein the microservice is identified using a safety prediction model generated from the condition type data (e.g., at operation 1320). In an example, a cloud repository of safety services may be accessed. A safety service may be identified from the cloud repository that will reduce the safety risk level and the microservice may be generated for the identified safety service.

In an example, the robot safety rule may be encapsulated for execution by an on premise edge compute node. In an example, encapsulation of the robot safety rule may include generation of an encapsulation container for the robot safety rule. In an example, a robot type may be identified for the robot and the encapsulated container may be generated using hardware virtualization or operating system virtualization based on the robot type.

In an example, the robot safety rule may be validated based on a comparison between outputs of the robot safety rule and expected outputs. In an example, a test case description may be obtained for validation of the robot safety rule. Instructions may be transmitted to a robot fleet control to initiate control of the robot according to the test case description and expected outputs of the robot safety rule may be determined based on the test case description. Validation of the robot safety rule may include comparing the outputs of the robot safety rule to the expected outputs. In an example, validation inputs may be obtained from other robots and validation of the robot safety rule may include evaluation of the validation inputs to determine that the robot is operating correctly using the updated software component.

In another example, a message may be transmitted to a human operator to request an environmental change to facilitate a testing scenario. Upon receipt of a response to the message that indicates that the environmental change has been made, control instructions may be transmitted to the robot to complete the testing scenario and output may be received from sensors of the robot. Validation of the robot safety rule may include evaluation of the received output to determine if the received output is within a range of values of the expected output.

In yet another example, a testing variation time value may be calculated based on a current workload of the robot. It may be determined that completion time for a test scenario is lower than the testing time variation value. A robot control message may be transmitted to the robot to use the robot safety rule to execute the test scenario and output may be received from the robot upon completion of the test scenario. Validation of the robot safety rule may include evaluation of the received output to determine if the received output is within a range of values of the expected output.

In an example, the microservice may be deployed (e.g., by the dynamic microservice deployment engine 225 as described in FIG. 2, etc.) to the robot. In an example, the microservice may be deployed by an on premise edge compute node. In an example, a relationship may be established between the on premise edge compute node and the robot. A microservice repository may be generated for the robot based on the relationship and the microservice may be added to the microservice repository. The microservice may be deployed to the robot using the microservice repository. In an example, it may be determined that a current microservice is unable to reduce the safety risk level and the current microservice may be removed from the microservice repository.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 14:
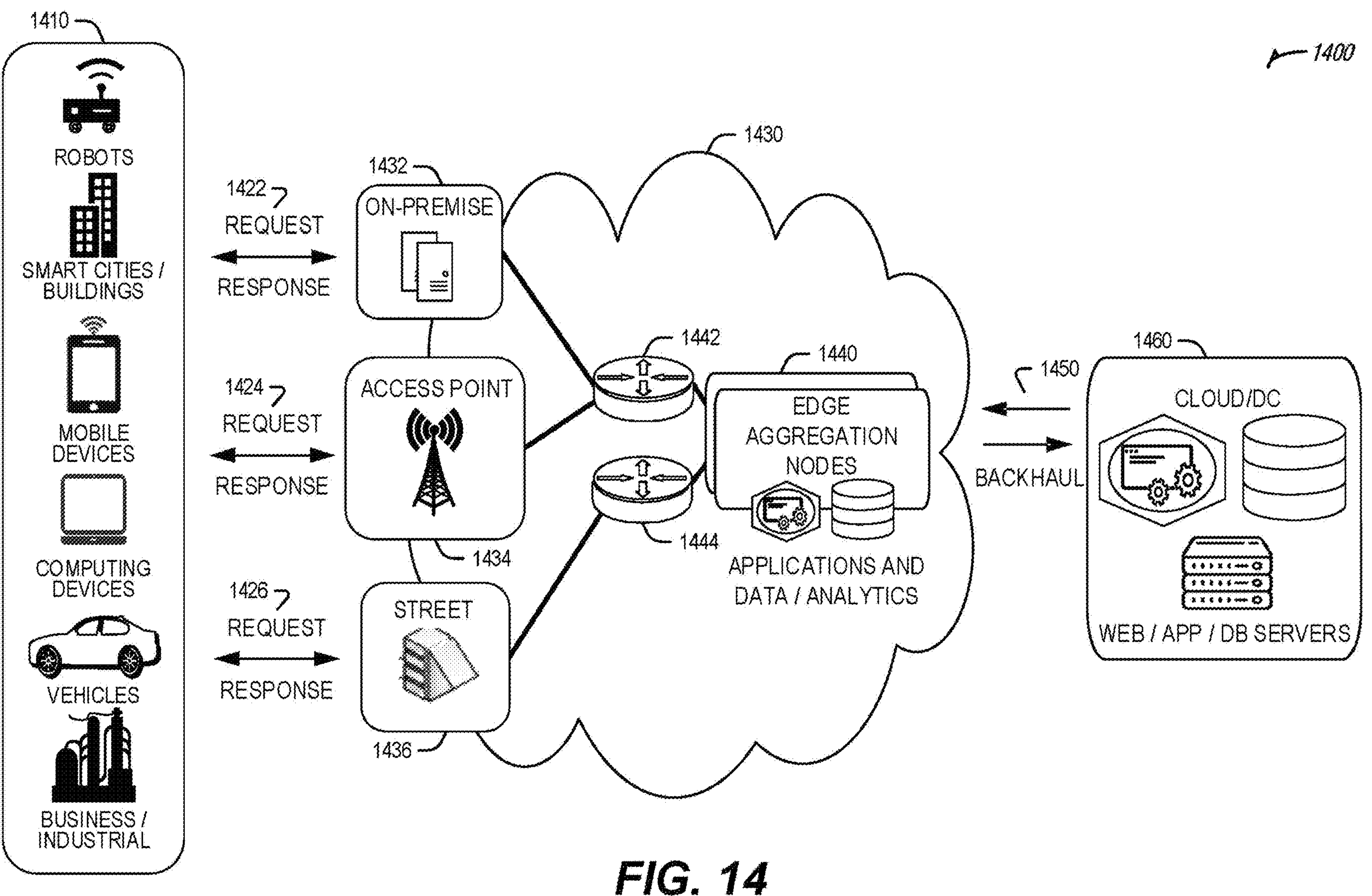
FIG. 14 illustrates an example approach for networking and services in an edge computing system.

In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the edge cloud 1430 to aggregate traffic and requests. Thus, within the edge cloud 1430, the TSP may deploy various compute and storage resources, such as at edge aggregation nodes 1440, to provide requested content. The edge aggregation nodes 1440 and other systems of the edge cloud 1430 are connected to a cloud or data center 1460, which uses a backhaul network 1450 to fulfill higher-latency requests from a cloud/data center for websites, applications, database servers, etc. Additional or consolidated instances of the edge aggregation nodes 1440 and the aggregation points 1442, 1444, including those deployed on a single server framework, may also be present within the edge cloud 1430 or other areas of the TSP infrastructure.

Figure 15:
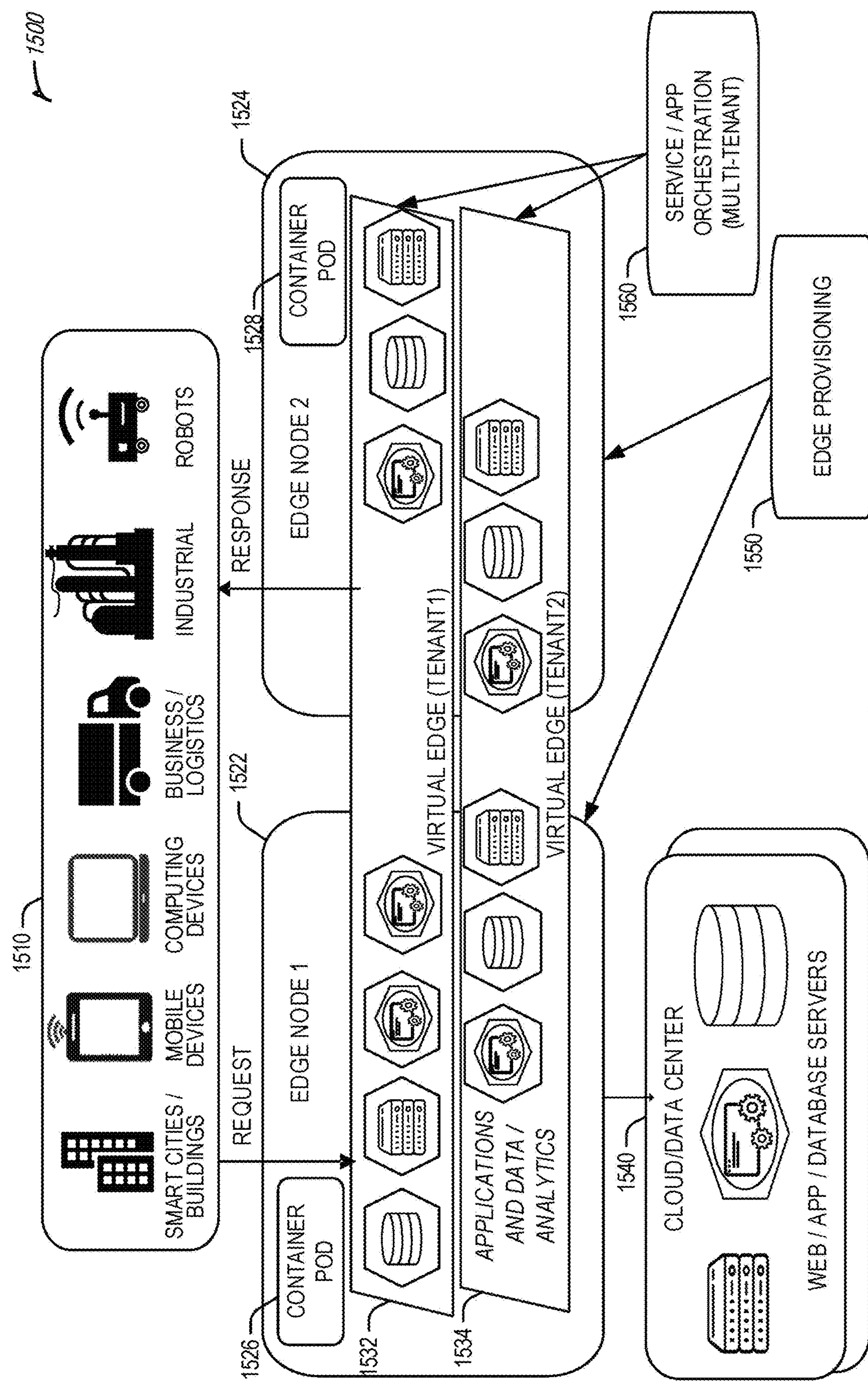
FIG. 15 illustrates deployment of a virtual edge configuration in an edge computing system operated among multiple edge nodes and multiple tenants.

FIG. 15 illustrates deployment and orchestration for virtual edge configurations across an edge computing system operated among multiple edge nodes and multiple tenants. Specifically, FIG. 15 depicts coordination of a first edge node 1522 and a second edge node 1524 in an edge computing system 1500, to fulfill requests and responses for various client endpoints 1510 (e.g., smart cities/building systems, mobile devices, computing devices, business/logistics systems, industrial systems, etc.), which access various virtual edge instances. Here, the virtual edge instances 1532, 1534 provide edge compute capabilities and processing in an edge cloud, with access to a cloud/data center 1540 for higher-latency requests for websites, applications, database servers, etc. However, the edge cloud enables coordination of processing among multiple edge nodes for multiple tenants or entities.

In the example of FIG. 15, these virtual edge instances include: a first virtual edge 1532, offered to a first tenant (Tenant 1), which offers a first combination of edge storage, computing, and services; and a second virtual edge 1534, offering a second combination of edge storage, computing, and services. The virtual edge instances 1532, 1534 are distributed among the edge nodes 1522, 1524, and may include scenarios in which a request and response are fulfilled from the same or different edge nodes. The configuration of the edge nodes 1522, 1524 to operate in a distributed yet coordinated fashion occurs based on edge provisioning functions 1550. The functionality of the edge nodes 1522, 1524 to provide coordinated operation for applications and services, among multiple tenants, occurs based on orchestration functions 1560.

It should be understood that some of the devices in 1510 are multi-tenant devices where Tenant 1 may function within a tenant1 'slice' while a Tenant 2 may function within a tenant2 slice (and, in further examples, additional or subtenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1522, 1524 may operate as security feature enforcement points for local resources allocated to multiple tenants per node. Additionally, tenant runtime and application execution (e.g., in instances 1532, 1534) may serve as an enforcement point for a security feature that creates a virtual edge abstraction of resources spanning potentially multiple physical hosting platforms. Finally, the orchestration functions 1560 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 1510, 1522, and 1540 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 15. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1522, 1524 may implement the use of containers, such as with the use of a container "pod" 1526, 1528 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1532, 1534 are partitioned according to the needs of each container.

With the use of container pods, a pod controller oversees the partitioning and allocation of containers and resources. The pod controller receives instructions from an orchestrator (e.g., orchestrator 1560) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1560 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 16:
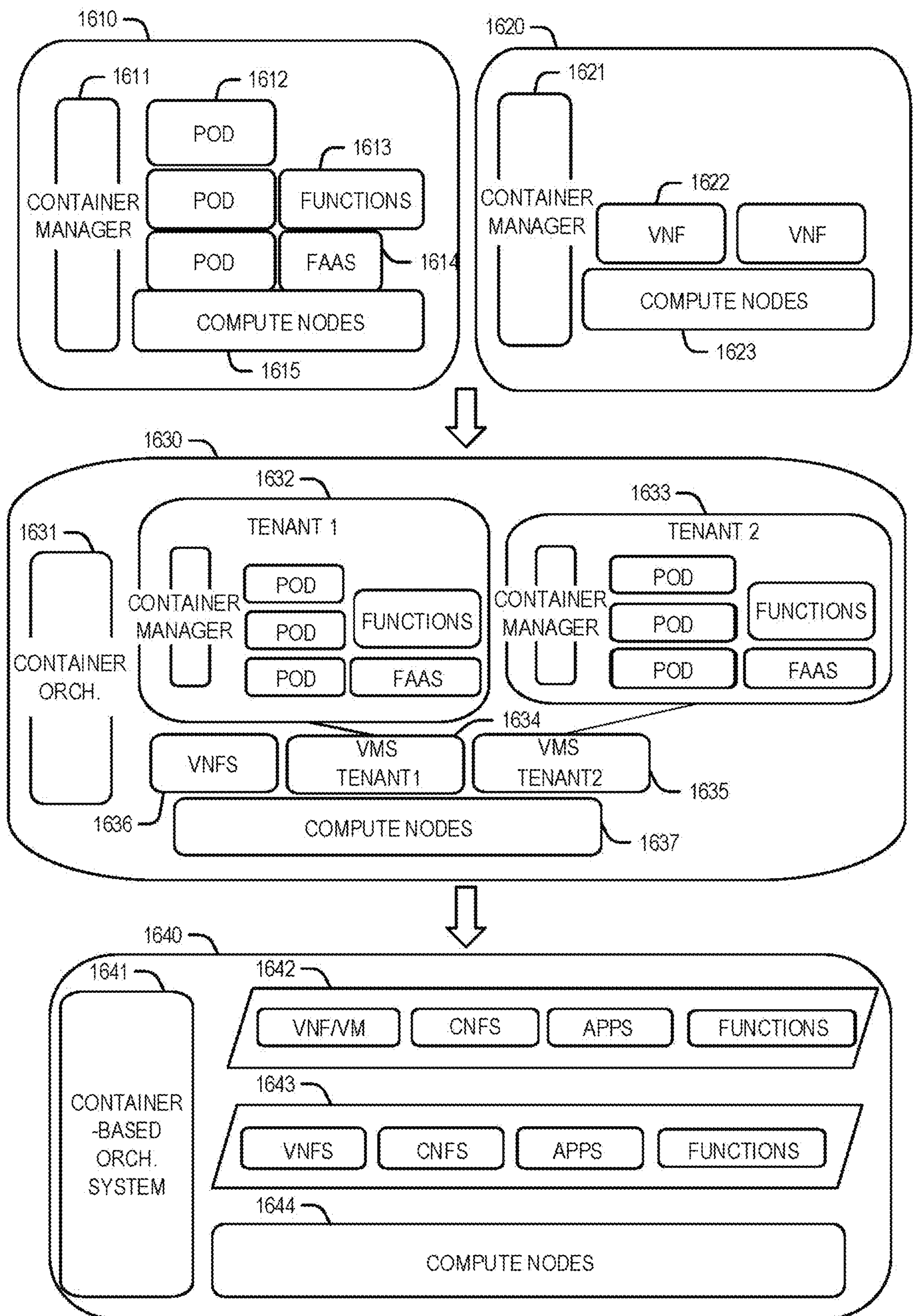
FIG. 16 illustrates various compute arrangements deploying containers in an edge computing system.

FIG. 16 illustrates additional compute arrangements deploying containers in an edge computing system. As a simplified example, system arrangements 1610, 1620 depict settings in which a pod controller (e.g., container managers 1611, 1621, and container orchestrator 1631) is adapted to launch containerized pods, functions, and functions-as-a-service instances through execution via compute nodes (1615 in arrangement 1610), or to separately execute containerized virtualized network functions through execution via compute nodes (1623 in arrangement 1620). This arrangement is adapted for use of multiple tenants in system arrangement 1630 (using compute nodes 1637), where containerized pods (e.g., pods 1612), functions (e.g., functions 1613, VNFs 1622, 1636), and functions-as-a-service instances (e.g., FaaS instance 1614) are launched within virtual machines (e.g., VMs 1634, 1635 for tenants 1632, 1633) specific to respective tenants (aside the execution of virtualized network functions). This arrangement is further adapted for use in system arrangement 1640, which provides containers 1642, 1643, or execution of the various functions, applications, and functions on compute nodes 1644, as coordinated by an container-based orchestration system 1641.

The system arrangements of depicted in FIG. 16 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 16, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 17:
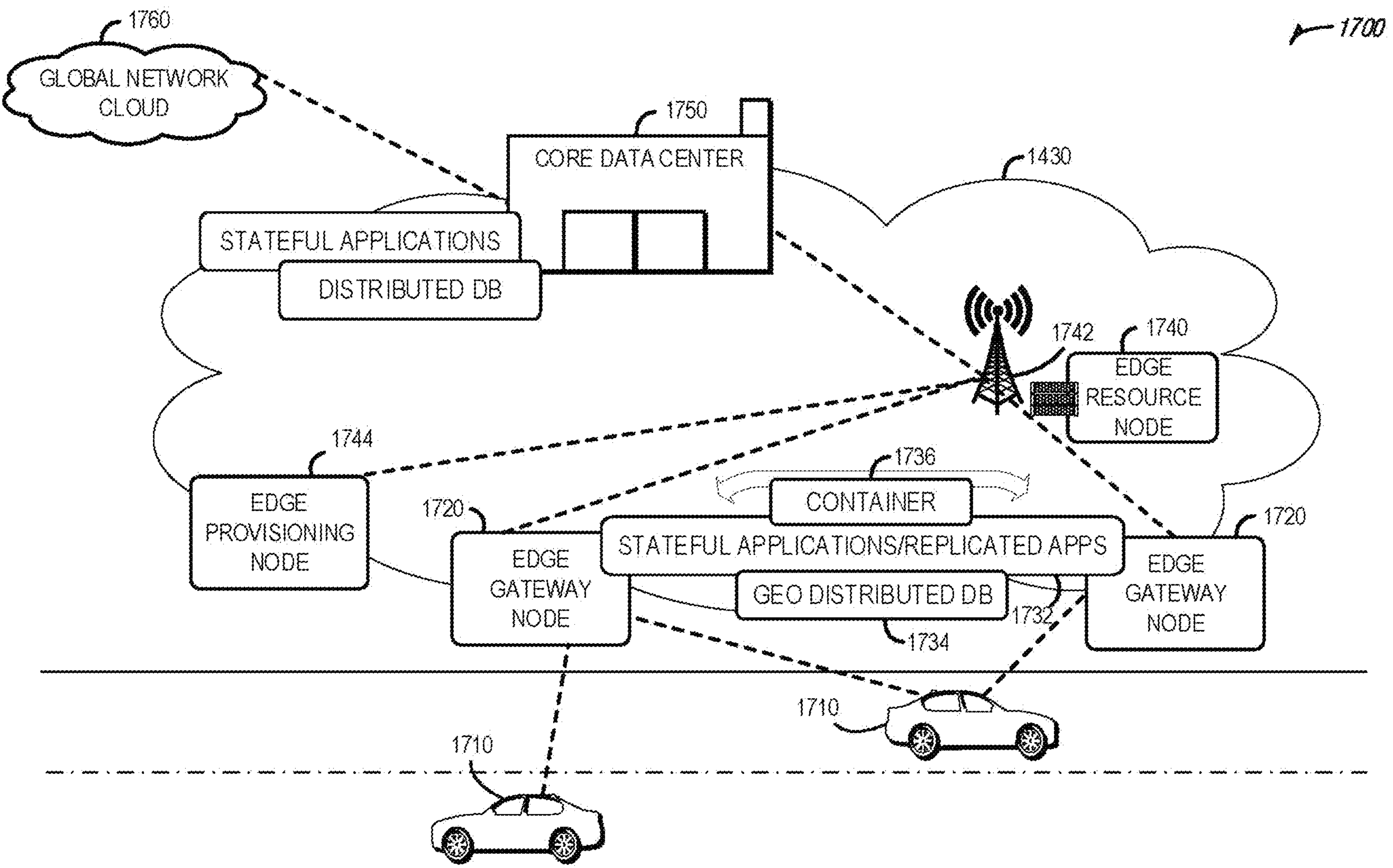
FIG. 17 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 17 shows a simplified vehicle compute and communication use case involving mobile access to applications in an edge computing system 1700 that implements an edge cloud 1430. In this use case, respective client compute nodes 1710 may be embodied as in-vehicle compute systems (e.g., in-vehicle navigation and/or infotainment systems) located in corresponding vehicles which communicate with the edge gateway nodes 1720 during traversal of a roadway. For instance, the edge gateway nodes 1720 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1710 and a particular edge gateway device 1720 may propagate so as to maintain a consistent connection and context for the client compute node 1710. Likewise, mobile edge nodes may aggregate at the high priority services or according to the throughput or latency resolution requirements for the underlying service(s) (e.g., in the case of drones). The respective edge gateway devices 1720 include an amount of processing and storage capabilities and, as such, some processing and/or storage of data for the client compute nodes 1710 may be performed on one or more of the edge gateway devices 1720.

The edge gateway devices 1720 may communicate with one or more edge resource nodes 1740, which are illustratively embodied as compute servers, appliances or components located at or in a communication base station 1742 (e.g., a based station of a cellular network). As discussed above, the respective edge resource nodes 1740 include an amount of processing and storage capabilities and, as such, some processing and/or storage of data for the client compute nodes 1710 may be performed on the edge resource node 1740. For example, the processing of data that is less urgent or important may be performed by the edge resource node 1740, while the processing of data that is of a higher urgency or importance may be performed by the edge gateway devices 1720 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1740 also communicate with the core data center 1750, which may include compute servers, appliances, and/or other components located in a central location (e.g., a central office of a cellular communication network). The core data center 1750 may provide a gateway to the global network cloud 1760 (e.g., the Internet) for the edge cloud 1430 operations formed by the edge resource node(s) 1740 and the edge gateway devices 1720. Additionally, in some examples, the core data center 1750 may include an amount of processing and storage capabilities and, as such, some processing and/or storage of data for the client compute devices may be performed on the core data center 1750 (e.g., processing of low urgency or importance, or high complexity).

The edge gateway nodes 1720 or the edge resource nodes 1740 may offer the use of stateful applications 1732 and a geographic distributed database 1734. Although the applications 1732 and database 1734 are illustrated as being horizontally distributed at a layer of the edge cloud 1430, it will be understood that resources, services, or other components of the application may be vertically distributed throughout the edge cloud (including, part of the application executed at the client compute node 1710, other parts at the edge gateway nodes 1720 or the edge resource nodes 1740, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1736 (or pod of containers) may be flexibly migrated from an edge node 1720 to other edge nodes (e.g., 1720, 1740, etc.) such that the container with an application and workload does not need to be reconstituted, re-compiled, re-interpreted in order for migration to work. However, in such settings, there may be some remedial or "swizzling" translation operations applied. For example, the physical hardware at node 1740 may differ from edge gateway node 1720 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 17 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1720, some others at the edge resource node 1740, and others in the core data center 1750 or global network cloud 1760.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1700 can include or be in communication with an edge provisioning node 1744. The edge provisioning node 1744 can distribute software such as the example computer readable instructions 1882 of FIG. 18B, to various receiving parties for implementing any of the methods described herein. The example edge provisioning node 1744 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 1744 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1744. For example, the entity that owns and/or operates the edge provisioning node 1744 may be a developer, a seller, and/or a licensor (or a customer and/or consumer thereof) of software instructions such as the example computer readable instructions 1882 of FIG. 18B. The receiving parties may be consumers, service providers, users, retailers, OEMs, etc., who purchase and/or license the software instructions for use and/or re-sale and/or sub-licensing.

In an example, edge provisioning node 1744 includes one or more servers and one or more storage devices. The storage devices host computer readable instructions such as the example computer readable instructions 1882 of FIG. 18B, as described below. Similarly to edge gateway devices 1720 described above, the one or more servers of the edge provisioning node 1744 are in communication with a base station 1742 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1882 from the edge provisioning node 1744. For example, the software instructions, which may correspond to the example computer readable instructions 1882 of FIG. 18B, may be downloaded to the example processor platform/s, which is to execute the computer readable instructions 1882 to implement the methods described herein.

In some examples, the processor platform(s) that execute the computer readable instructions 1882 can be physically located in different geographic locations, legal jurisdictions, etc. In some examples, one or more servers of the edge provisioning node 1744 periodically offer, transmit, and/or force updates to the software instructions (e.g., the example computer readable instructions 1882 of FIG. 18B) to ensure improvements, patches, updates, etc. are distributed and applied to the software instructions implemented at the end user devices. In some examples, different components of the computer readable instructions 1882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 18A and 18B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 18A:
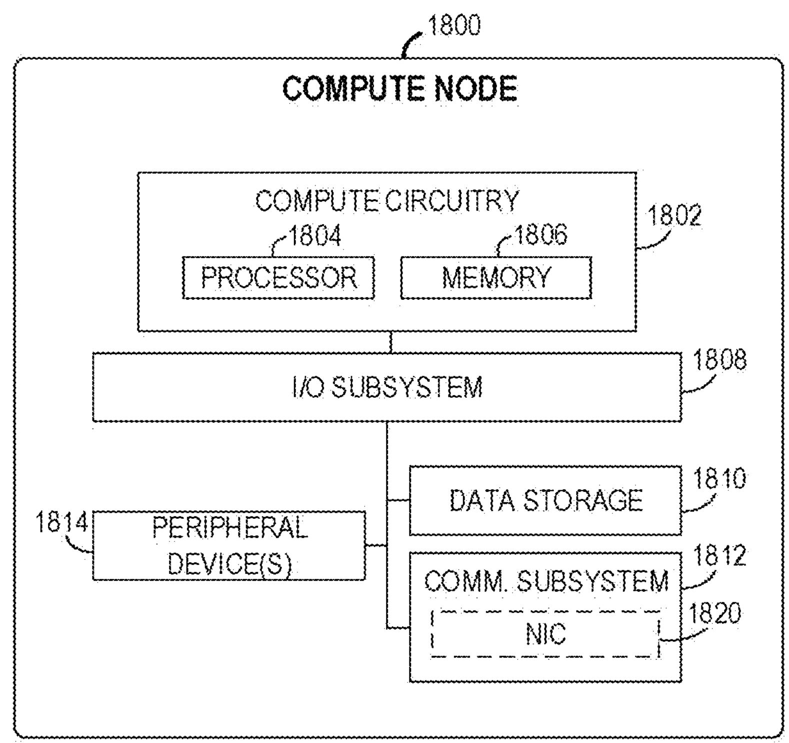
FIG. 18A provides an overview of example components for compute deployed at a compute node in an edge computing system.

In the simplified example depicted in FIG. 18A, an edge compute node 1800 includes a compute engine (also referred to herein as "compute circuitry") 1802, an input/output (I/O) subsystem 1808, data storage 1810, a communication circuitry subsystem 1812, and, optionally, one or more peripheral devices 1814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1800 may be embodied as any type of engine, device, or collection of devices capable of performing various compute functions. In some examples, the compute node 1800 may be embodied as a single device such as an integrated circuit, an embedded system, a field-programmable gate array (FPGA), a system-on-a-chip (SOC), or other integrated system or device. In the illustrative example, the compute node 1800 includes or is embodied as a processor 1804 and a memory 1806. The processor 1804 may be embodied as any type of processor capable of performing the functions described herein (e.g., executing an application). For example, the processor 1804 may be embodied as a multi-core processor(s), a microcontroller, a processing unit, a specialized or special purpose processing unit, or other processor or processing/controlling circuit.

In some examples, the processor 1804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1804 may work in coordination with each other to execute many types of operations and instructions within and on behalf of the compute node 1800.

The memory 1806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1806 may be integrated into the processor 1804. The memory 1806 may store various software and data used during operation such as one or more applications, data operated on by the application(s), libraries, and drivers.

The compute circuitry 1802 is communicatively coupled to other components of the compute node 1800 via the I/O subsystem 1808, which may be embodied as circuitry and/or components to facilitate input/output operations with the compute circuitry 1802 (e.g., with the processor 1804 and/or the main memory 1806) and other components of the compute circuitry 1802. For example, the I/O subsystem 1808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1808 may form a portion of a system-on-a-chip (SoC) and be incorporated, along with one or more of the processor 1804, the memory 1806, and other components of the compute circuitry 1802, into the compute circuitry 1802.

The one or more illustrative data storage devices 1810 may be embodied as any type of devices configured for short-term or long-term storage of data such as, for example, memory devices and circuits, memory cards, hard disk drives, solid-state drives, or other data storage devices. Individual data storage devices 1810 may include a system partition that stores data and firmware code for the data storage device 1810. Individual data storage devices 1810 may also include one or more operating system partitions that store data files and executables for operating systems depending on, for example, the type of compute node 1800.

The communication circuitry 1812 may be embodied as any communication circuit, device, or collection thereof, capable of enabling communications over a network between the compute circuitry 1802 and another compute device (e.g., an edge gateway of an implementing edge computing system). The communication circuitry 1812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1812 includes a network interface controller (NIC) 1820, which may also be referred to as a host fabric interface (HFI). The NIC 1820 may be embodied as one or more add-in-boards, daughter cards, network interface cards, controller chips, chipsets, or other devices that may be used by the compute node 1800 to connect with another compute device (e.g., an edge gateway node). In some examples, the NIC 1820 may be embodied as part of a system-on-a-chip (SoC) that includes one or more processors, or included on a multichip package that also contains one or more processors. In some examples, the NIC 1820 may include a local processor (not shown) and/or a local memory (not shown) that are both local to the NIC 1820. In such examples, the local processor of the NIC 1820 may be capable of performing one or more of the functions of the compute circuitry 1802 described herein. Additionally, or alternatively, in such examples, the local memory of the NIC 1820 may be integrated into one or more components of the client compute node at the board level, socket level, chip level, and/or other levels.

Additionally, in some examples, a respective compute node 1800 may include one or more peripheral devices 1814. Such peripheral devices 1814 may include any type of peripheral device found in a compute device or server such as audio input devices, a display, other input/output devices, interface devices, and/or other peripheral devices, depending on the particular type of the compute node 1800. In further examples, the compute node 1800 may be embodied by a respective edge compute node (whether a client, gateway, or aggregation node) in an edge computing system or like forms of appliances, computers, subsystems, circuitry, or other components.

Figure 18B:
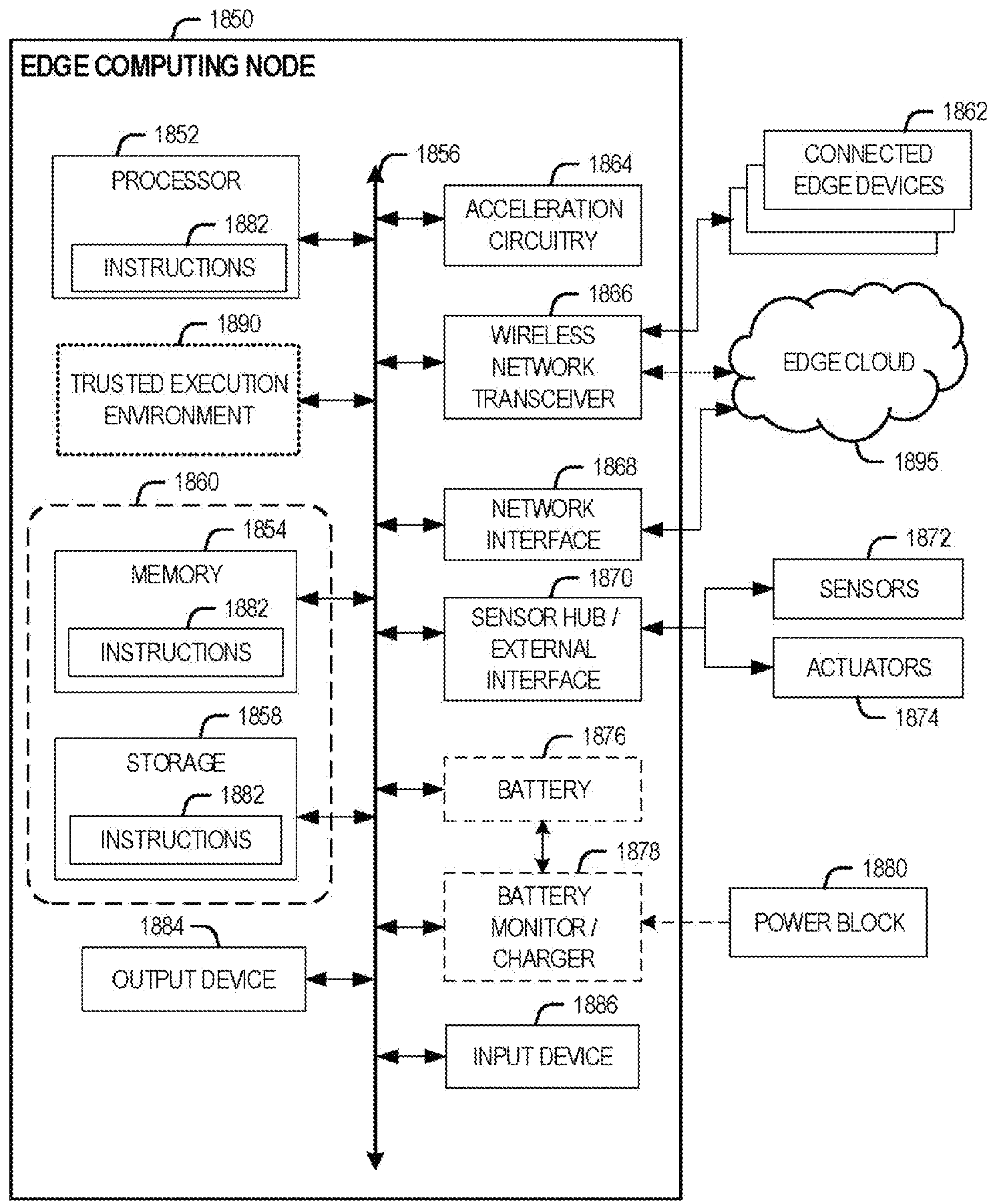
FIG. 18B provides a further overview of example components within a computing device in an edge computing system.

In a more detailed example, FIG. 18B illustrates a block diagram of an example of components that may be present in an edge computing node 1850 for implementing the techniques (e.g., operations, processes, methods, and methodologies) described herein. This edge computing node 1850 provides a closer view of the respective components of node 1800 when implemented as or as part of a computing device (e.g., as a mobile device, a base station, server, gateway, etc.). The edge computing node 1850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1850, or as components otherwise incorporated within a chassis of a larger system.

The edge computing device 1850 may include processing circuitry in the form of a processor 1852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1852 may be a part of a system on a chip (SoC) in which the processor 1852 and other components are formed into a single integrated circuit, or a single package, such as the Edison™ or Galileo™ SoC boards from Intel Corporation, Santa Clara, California. As an example, the processor 1852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1852 and accompanying circuitry may be provided in a single socket form factor, multiple socket form factor, or a variety of other formats, including in limited hardware configurations or configurations that include fewer than all elements shown in FIG. 18B.

The processor 1852 may communicate with a system memory 1854 over an interconnect 1856 (e.g., a bus). Any number of memory devices may be used to provide for a given amount of system memory. As examples, the memory 1854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1858 may also couple to the processor 1852 via the interconnect 1856. In an example, the storage 1858 may be implemented via a solid-state disk drive (SSDD). Other devices that may be used for the storage 1858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1858 may be on-die memory or registers associated with the processor 1852. However, in some examples, the storage 1858 may be implemented using a micro hard disk drive (HDD). Further, any number of new technologies may be used for the storage 1858 in addition to, or instead of, the technologies described, such resistance change memories, phase change memories, holographic memories, or chemical memories, among others.

The components may communicate over the interconnect 1856. The interconnect 1856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1856 may couple the processor 1852 to a transceiver 1866, for communications with the connected edge devices 1862. The transceiver 1866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1866 (or multiple transceivers) may communicate using multiple standards or radios for communications at a different range. For example, the edge computing node 1850 may communicate with close devices, e.g., within about 10 meters, using a local transceiver based on Bluetooth Low Energy (BLE), or another low power radio, to save power. More distant connected edge devices 1862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1866 (e.g., a radio transceiver) may be included to communicate with devices or services in the edge cloud 1895 via local or wide area network protocols. The wireless network transceiver 1866 may be a low-power wide-area (LPWA) transceiver that follows the IEEE 802.15.4, or IEEE 802.15.4g standards, among others. The edge computing node 1850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1866, as described herein. For example, the transceiver 1866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1868 may be included to provide a wired communication to nodes of the edge cloud 1895 or to other devices, such as the connected edge devices 1862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1868 may be included to enable connecting to a second network, for example, a first NIC 1868 providing communications to the cloud over Ethernet, and a second NIC 1868 providing communications to other devices over another type of network.

Given the variety of types of applicable communications from the device to another component or network, applicable communications circuitry used by the device may include or be embodied by any one or more of components 1864, 1866, 1868, or 1870. Accordingly, in various examples, applicable means for communicating (e.g., receiving, transmitting, etc.) may be embodied by such communications circuitry.

The edge computing node 1850 may include or be coupled to acceleration circuitry 1864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1856 may couple the processor 1852 to a sensor hub or external interface 1870 that is used to connect additional devices or subsystems. The devices may include sensors 1872, such as accelerometers, level sensors, flow sensors, optical light sensors, camera sensors, temperature sensors, global navigation system (e.g., GPS) sensors, pressure sensors, barometric pressure sensors, and the like. The hub or interface 1870 further may be used to connect the edge computing node 1850 to actuators 1874, such as power switches, valve actuators, an audible sound generator, a visual warning device, and the like.

In some optional examples, various input/output (I/O) devices may be present within or connected to, the edge computing node 1850. For example, a display or other output device 1884 may be included to show information, such as sensor readings or actuator position. An input device 1886, such as a touch screen or keypad may be included to accept input. An output device 1884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1876 may power the edge computing node 1850, although, in examples in which the edge computing node 1850 is mounted in a fixed location, it may have a power supply coupled to an electrical grid, or the battery may be used as a backup or for temporary capabilities. The battery 1876 may be a lithium ion battery, or a metal-air battery, such as a zinc-air battery, an aluminum-air battery, a lithium-air battery, and the like.

A battery monitor/charger 1878 may be included in the edge computing node 1850 to track the state of charge (SoCh) of the battery 1876, if included. The battery monitor/charger 1878 may be used to monitor other parameters of the battery 1876 to provide failure predictions, such as the state of health (SoH) and the state of function (SoF) of the battery 1876. The battery monitor/charger 1878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1878 may communicate the information on the battery 1876 to the processor 1852 over the interconnect 1856. The battery monitor/charger 1878 may also include an analog-to-digital (ADC) converter that enables the processor 1852 to directly monitor the voltage of the battery 1876 or the current flow from the battery 1876. The battery parameters may be used to determine actions that the edge computing node 1850 may perform, such as transmission frequency, mesh network operation, sensing frequency, and the like.

A power block 1880, or other power supply coupled to a grid, may be coupled with the battery monitor/charger 1878 to charge the battery 1876. In some examples, the power block 1880 may be replaced with a wireless power receiver to obtain the power wirelessly, for example, through a loop antenna in the edge computing node 1850. A wireless battery charging circuit, such as an LTC4020 chip from Linear Technologies of Milpitas, California, among others, may be included in the battery monitor/charger 1878. The specific charging circuits may be selected based on the size of the battery 1876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1858 may include instructions 1882 in the form of software, firmware, or hardware commands to implement the techniques described herein. Although such instructions 1882 are shown as code blocks included in the memory 1854 and the storage 1858, it may be understood that any of the code blocks may be replaced with hardwired circuits, for example, built into an application specific integrated circuit (ASIC).

In an example, the instructions 1882 provided via the memory 1854, the storage 1858, or the processor 1852 may be embodied as a non-transitory, machine-readable medium 1860 including code to direct the processor 1852 to perform electronic operations in the edge computing node 1850. The processor 1852 may access the non-transitory, machine-readable medium 1860 over the interconnect 1856. For instance, the non-transitory, machine-readable medium 1860 may be embodied by devices described for the storage 1858 or may include specific storage units such as optical disks, flash drives, or any number of other hardware devices. The non-transitory, machine-readable medium 1860 may include instructions to direct the processor 1852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1882 on the processor 1852 (separately, or in combination with the instructions 1882 of the machine readable medium 1860) may configure execution or operation of a trusted execution environment (TEE) 1890. In an example, the TEE 1890 operates as a protected area accessible to the processor 1852 for secure execution of instructions and secure access to data. Various implementations of the TEE 1890, and an accompanying secure area in the processor 1852 or the memory 1854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1850 through the TEE 1890 and the processor 1852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Additional Notes & Examples

Example 1 is a method for real-time robot microservice deployment, comprising: collecting condition data for an environment in which a robot is operating; classifying the robot with a condition type; analyzing condition type data selected from the condition data based on the condition type to calculate a safety risk level for the robot; identifying a microservice to provide a robot safety rule for the robot based on the safety risk level, wherein the microservice is identified using a safety prediction model generated from the condition type data; and deploying the identified microservice to the robot.

In Example 2, the subject matter of Example 1 wherein, the condition data is collected from a public condition data source that includes outdoor environmental conditions, wherein the outdoor environmental conditions include a weather condition or a road condition.

In Example 3, the subject matter of Examples 1-2 wherein, the condition data is collected from a public condition data source that includes indoor environmental conditions, wherein the indoor environmental conditions include building configuration data or building operating conditions.

In Example 4, the subject matter of Examples 1-3 wherein, the condition data is collected from a private condition data source that includes profile data of at least one human-robot interaction.

In Example 5, the subject matter of Examples 1-4 wherein, the condition data is collected from a sensor of the robot that includes robot environmental conditions, wherein the robot environmental conditions include camera data or light detection and ranging data.

In Example 6, the subject matter of Examples 1-5 wherein, calculating the safety risk level further comprises: identifying a current robot safety rule for the robot; determining risk factors for the current robot safety rule using the condition type data; applying weights to the risk factors to generate weighted risk factor values; and summing the weighted risk factor values to create a risk factor sum, wherein the safety risk level is calculated by determining placement of the risk factor sum in a set of safety risk level thresholds.

In Example 7, the subject matter of Examples 1-6 includes, establishing a relationship between an on premise edge compute node and the robot; generating a microservice repository for the robot based on the relationship; and adding the microservice to the microservice repository for deployment to the robot using the microservice repository.

In Example 8, the subject matter of Example 7 includes, determining that a current microservice is unable to reduce the safety risk level; and removing the current microservice from the microservice repository.

In Example 9, the subject matter of Examples 1-8 wherein, the microservice is deployed by an on premise edge compute node.

In Example 10, the subject matter of Examples 1-9 includes, accessing a cloud repository of safety services; identifying a safety service from the cloud repository that will reduce the safety risk level; and generating the microservice for the identified safety service.

Example 11 is at least one machine-readable medium including instructions that, when executed by a machine, cause the machine to perform any method of Examples 1-10.

Example 12 is a system comprising means to perform any method of Examples 1-10.

Example 13 is a method for highly reliable robot software update deployment, comprising: identifying an updated software component corresponding to a software component executing on the robot; encapsulating the updated software component for execution by an edge computing node; validating the updated software component based on a comparison between outputs of the updated software component and the software component; and upon validation of the updated software component, deploying the updated software component to the robot.

In Example 14, the subject matter of Example 13 includes, obtaining the updated software component from a software update package that includes a test case description; transmitting instructions to a robot fleet control to initiate control of the robot according to the test case description; and determining expected outputs of the updated software component based on the test case description, wherein validation of the updated software component includes comparing the outputs of the updated software component to the expected outputs.

In Example 15, the subject matter of Examples 13-14 wherein, encapsulating the updated software component further comprises generating an encapsulation container for the updated software component.

In Example 16, the subject matter of Example 15 includes, identifying a robot type for the robot; and generating the encapsulated container using hardware virtualization or operating system virtualization based on the robot type.

In Example 17, the subject matter of Examples 13-16 includes, obtaining validation inputs from other robots, wherein validating the updated software component includes evaluating the validation inputs to determine that the robot is operating correctly using the updated software component.

In Example 18, the subject matter of Examples 13-17 includes, transmitting a message to a human operator to request an environmental change to facilitate a testing scenario; upon receipt of a response to the message indicating that the environmental change has been made, transmitting control instructions to the robot to complete the testing scenario; and receiving output from sensors of the robot; wherein validating the updated software component includes evaluating the received output to determine if the received output is within range of expected output values for the updated software component.

In Example 19, the subject matter of Examples 13-18 includes, calculating a testing variation time value based on a current workload of the robot; determining that completion time for a test scenario is lower than the testing time variation value; transmitting a robot control message to the robot to use the updated software component to execute the test scenario; and receiving output from the robot upon completion of the test scenario, wherein validating the updated software component includes evaluating the received output to determine if the received output is within range of expected output values for the updated software component.

Example 20 is at least one machine-readable medium including instructions that, when executed by a machine, cause the machine to perform any method of Examples 13-19.

Example 21 is a system comprising means to perform any method of Examples 13-19.

Example 22 is an apparatus for reliable real-time deployment of robot safety updates, comprising: at least one processor; and memory including instructions that, when executed by the at least one processor, cause the at least one processor to perform operations to: collect condition data for an environment in which a robot is operating; classify the robot with a condition type; analyze condition type data selected from the condition data based on the condition type to calculate a safety risk level for the robot; and identify a microservice to provide a robot safety rule for the robot based on the safety risk level, wherein the microservice is identified using a safety prediction model generated from the condition type data.

In Example 23, the subject matter of Example 22 includes, the memory further comprising instructions that, when executed by the at least one processor, cause the at least one processor to perform operations to: encapsulate the robot safety rule for execution by an on premise edge compute node; validate the robot safety rule based on a comparison between outputs of the robot safety rule and expected outputs; and upon validation of the robot safety rule, deploy the identified microservice to the robot.

In Example 24, the subject matter of Examples 22-23 wherein, the instructions to calculate the safety risk level further comprises instructions that, when executed by the at least one processor, cause the at least one processor to perform operations to: identify a current robot safety rule for the robot; determine risk factors for the current robot safety rule using the condition type data; apply weights to the risk factors to generate weighted risk factor values; and sum the weighted risk factor values to create a risk factor sum, wherein the safety risk level is calculated by determining placement of the risk factor sum in a set of safety risk level thresholds.

In Example 25, the subject matter of Examples 23-24 includes, the memory further comprising instructions that, when executed by the at least one processor, cause the at least one processor to perform operations to: establish a relationship between the on premise edge compute node and the robot; generate a microservice repository for the robot based on the relationship; and add the microservice to the microservice repository for deployment to the robot using the microservice repository.

In Example 26, the subject matter of Example 25 includes, the memory further comprising instructions that, when executed by the at least one processor, cause the at least one processor to perform operations to: determine that a current microservice is unable to reduce the safety risk level; and remove the current microservice from the microservice repository.

In Example 27, the subject matter of Examples 22-26 includes, the memory further comprising instructions that, when executed by the at least one processor, cause the at least one processor to perform operations to: access a cloud repository of safety services; identify a safety service from the cloud repository that will reduce the safety risk level; and generate the microservice for the identified safety service.

In Example 28, the subject matter of Examples 22-27 includes, the memory further comprising instructions that, when executed by the at least one processor, cause the at least one processor to perform operations to: obtain a test case description for validation of the robot safety rule; transmit instructions to a robot fleet control to initiate control of the robot according to the test case description; and determine the expected outputs of the robot safety rule based on the test case description.

In Example 29, the subject matter of Examples 23-28 wherein, the instructions to encapsulate the robot safety rule further comprises instructions to generate an encapsulation container for the robot safety rule.

In Example 30, the subject matter of Example 29 includes, the memory further comprising instructions that, when executed by the at least one processor, cause the at least one processor to perform operations to: identify a robot type for the robot; and generate the encapsulated container using hardware virtualization or operating system virtualization based on the robot type.

In Example 31, the subject matter of Examples 23-30 includes, the memory further comprising instructions that, when executed by the at least one processor, cause the at least one processor to perform operations to obtain validation inputs from other robots, wherein the instructions to validate the robot safety rule includes instructions to evaluate the validation inputs to determine that the robot is operating correctly using the robot safety rule.

In Example 32, the subject matter of Examples 23-31 includes, the memory further comprising instructions that, when executed by the at least one processor, cause the at least one processor to perform operations to: transmit a message to a human operator to request an environmental change to facilitate a testing scenario; upon receipt of a response to the message indicating that the environmental change has been made, transmit control instructions to the robot to complete the testing scenario; and receive output from sensors of the robot, wherein the instructions to validate the robot safety rule includes instructions to evaluate the received output to determine if the received output is within a range of values of the expected output.

In Example 33, the subject matter of Examples 23-32 includes, the memory further comprising instructions that, when executed by the at least one processor, cause the at least one processor to perform operations to: calculate a testing variation time value based on a current workload of the robot; determine that completion time for a test scenario is lower than the testing time variation value; transmit a robot control message to the robot to use robot safety rule to execute the test scenario; and receive output from the robot upon completion of the test scenario, wherein the instructions to validate the robot safety rule includes instruction to evaluate the received output to determine if the received output is within a range of values of the expected output.

In Example 34, the subject matter of Examples 22-33 wherein, the condition data is collected from a public condition data source that includes outdoor environmental conditions, wherein the outdoor environmental conditions include a weather condition or a road condition.

In Example 35, the subject matter of Examples 22-34 wherein, the condition data is collected from a public condition data source that includes indoor environmental conditions, wherein the indoor environmental conditions include building configuration data or building operating conditions.

In Example 36, the subject matter of Examples 22-35 wherein, the condition data is collected from a private condition data source that includes profile data for at least one human-robot interaction.

In Example 37, the subject matter of Examples 22-36 wherein, the condition data is collected from a sensor of the robot that includes robot environmental conditions, wherein the robot environmental conditions include camera data or light detection and ranging data.

Example 38 is at least one non-transitory machine-readable medium including instructions for reliable real-time deployment of robot safety updates that, when executed by at least one processor, cause the at least one processor to perform operations to: collect condition data for an environment in which a robot is operating; classify the robot with a condition type; analyze condition type data selected from the condition data based on the condition type to calculate a safety risk level for the robot; and identify a microservice to provide a robot safety rule for the robot based on the safety risk level, wherein the microservice is identified using a safety prediction model generated from the condition type data.

In Example 39, the subject matter of Example 38 includes, instructions that, when executed by the at least one processor, cause the at least one processor to perform operations to: encapsulate the robot safety rule for execution by an on premise edge compute node; validate the robot safety rule based on a comparison between outputs of the robot safety rule and expected outputs; and upon validation of the robot safety rule, deploy the identified microservice to the robot.

In Example 40, the subject matter of Examples 38-39 wherein, the instructions to calculate the safety risk level further comprises instructions that, when executed by the at least one processor, cause the at least one processor to perform operations to: identify a current robot safety rule for the robot; determine risk factors for the current robot safety rule using the condition type data; apply weights to the risk factors to generate weighted risk factor values; and sum the weighted risk factor values to create a risk factor sum, wherein the safety risk level is calculated by determining placement of the risk factor sum in a set of safety risk level thresholds.

In Example 41, the subject matter of Examples 39-40 includes, instructions that, when executed by the at least one processor, cause the at least one processor to perform operations to: establish a relationship between the on premise edge compute node and the robot; generate a microservice repository for the robot based on the relationship; and add the microservice to the microservice repository for deployment to the robot using the microservice repository.

In Example 42, the subject matter of Example 41 includes, instructions that, when executed by the at least one processor, cause the at least one processor to perform operations to: determine that a current microservice is unable to reduce the safety risk level; and remove the current microservice from the microservice repository.

In Example 43, the subject matter of Examples 38-42 includes, instructions that, when executed by the at least one processor, cause the at least one processor to perform operations to: access a cloud repository of safety services; identify a safety service from the cloud repository that will reduce the safety risk level; and generate the microservice for the identified safety service.

In Example 44, the subject matter of Examples 38-43 includes, instructions that, when executed by the at least one processor, cause the at least one processor to perform operations to: obtain a test case description for validation of the robot safety rule; transmit instructions to a robot fleet control to initiate control of the robot according to the test case description; and determine the expected outputs of the robot safety rule based on the test case description.

In Example 45, the subject matter of Examples 39-44 wherein, the instructions to encapsulate the robot safety rule further comprises instructions to generate an encapsulation container for the robot safety rule.

In Example 46, the subject matter of Example 45 includes, instructions that, when executed by the at least one processor, cause the at least one processor to perform operations to: identify a robot type for the robot; and generate the encapsulated container using hardware virtualization or operating system virtualization based on the robot type.

In Example 47, the subject matter of Examples 39-46 includes, instructions that, when executed by the at least one processor, cause the at least one processor to perform operations to obtain validation inputs from other robots, wherein the instructions to validate the robot safety rule includes instructions to evaluate the validation inputs to determine that the robot is operating correctly using the robot safety rule.

In Example 48, the subject matter of Examples 39-47 includes, instructions that, when executed by the at least one processor, cause the at least one processor to perform operations to: transmit a message to a human operator to request an environmental change to facilitate a testing scenario; upon receipt of a response to the message indicating that the environmental change has been made, transmit control instructions to the robot to complete the testing scenario; and receive output from sensors of the robot, wherein the instructions to validate the robot safety rule includes instructions to evaluate the received output to determine if the received output is within a range of values of the expected output.

In Example 49, the subject matter of Examples 39-48 includes, instructions that, when executed by the at least one processor, cause the at least one processor to perform operations to: calculate a testing variation time value based on a current workload of the robot; determine that completion time for a test scenario is lower than the testing time variation value; transmit a robot control message to the robot to use robot safety rule to execute the test scenario; and receive output from the robot upon completion of the test scenario, wherein the instructions to validate the robot safety rule includes instruction to evaluate the received output to determine if the received output is within a range of values of the expected output.

In Example 50, the subject matter of Examples 38-49 wherein, the condition data is collected from a public condition data source that includes outdoor environmental conditions, wherein the outdoor environmental conditions include a weather condition or a road condition.

In Example 51, the subject matter of Examples 38-50 wherein, the condition data is collected from a public condition data source that includes indoor environmental conditions, wherein the indoor environmental conditions include building configuration data or building operating conditions.

In Example 52, the subject matter of Examples 38-51 wherein, the condition data is collected from a private condition data source that includes profile data for at least one human-robot interaction.

In Example 53, the subject matter of Examples 38-52 wherein, the condition data is collected from a sensor of the robot that includes robot environmental conditions, wherein the robot environmental conditions include camera data or light detection and ranging data.

Example 54 is a method for reliable real-time deployment of robot safety updates, comprising: collecting condition data for an environment in which a robot is operating; classifying the robot with a condition type; analyzing condition type data selected from the condition data based on the condition type to calculate a safety risk level for the robot; and identifying a microservice to provide a robot safety rule for the robot based on the safety risk level, wherein the microservice is identified using a safety prediction model generated from the condition type data.

In Example 55, the subject matter of Example 54 includes, encapsulating the robot safety rule for execution by an on premise edge compute node; validating the robot safety rule based on a comparison between outputs of the robot safety rule and expected outputs; and upon validation of the robot safety rule, deploying the identified microservice to the robot.

In Example 56, the subject matter of Examples 54-55 wherein, calculating the safety risk level further comprises: identifying a current robot safety rule for the robot; determining risk factors for the current robot safety rule using the condition type data; applying weights to the risk factors to generate weighted risk factor values; and summing the weighted risk factor values to create a risk factor sum, wherein the safety risk level is calculated by determining placement of the risk factor sum in a set of safety risk level thresholds.

In Example 57, the subject matter of Examples 55-56 includes, establishing a relationship between the on premise edge compute node and the robot; generating a microservice repository for the robot based on the relationship; and adding the microservice to the microservice repository for deployment to the robot using the microservice repository.

In Example 58, the subject matter of Example 57 includes, determining that a current microservice is unable to reduce the safety risk level; and removing the current microservice from the microservice repository.

In Example 59, the subject matter of Examples 54-58 includes, accessing a cloud repository of safety services; identifying a safety service from the cloud repository that will reduce the safety risk level; and generating the microservice for the identified safety service.

In Example 60, the subject matter of Examples 54-59 includes, obtaining a test case description for validation of the robot safety rule; transmitting instructions to a robot fleet control to initiate control of the robot according to the test case description; and determining the expected outputs of the robot safety rule based on the test case description.

In Example 61, the subject matter of Examples 55-60 wherein, encapsulating the robot safety rule further comprises generating an encapsulation container for the robot safety rule.

In Example 62, the subject matter of Example 61 includes, identifying a robot type for the robot; and generating the encapsulated container using hardware virtualization or operating system virtualization based on the robot type.

In Example 63, the subject matter of Examples 55-62 includes, obtaining validation inputs from other robots, wherein validating the robot safety rule includes evaluating the validation inputs to determine that the robot is operating correctly using the robot safety rule.

In Example 64, the subject matter of Examples 55-63 includes, transmitting a message to a human operator to request an environmental change to facilitate a testing scenario; upon receipt of a response to the message indicating that the environmental change has been made, transmitting control instructions to the robot to complete the testing scenario; and receiving output from sensors of the robot, wherein validating the robot safety rule includes evaluating the received output to determine if the received output is within a range of values of the expected output.

In Example 65, the subject matter of Examples 55-64 includes, calculating a testing variation time value based on a current workload of the robot; determining that completion time for a test scenario is lower than the testing time variation value; transmitting a robot control message to the robot to use robot safety rule to execute the test scenario; and receiving output from the robot upon completion of the test scenario, wherein validating the robot safety rule includes evaluating the received output to determine if the received output is within a range of values of the expected output.

In Example 66, the subject matter of Examples 54-65 wherein, the condition data is collected from a public condition data source that includes outdoor environmental conditions, wherein the outdoor environmental conditions include a weather condition or a road condition.

In Example 67, the subject matter of Examples 54-66 wherein, the condition data is collected from a public condition data source that includes indoor environmental conditions, wherein the indoor environmental conditions include building configuration data or building operating conditions.

In Example 68, the subject matter of Examples 54-67 wherein, the condition data is collected from a private condition data source that includes profile data for at least one human-robot interaction.

In Example 69, the subject matter of Examples 54-68 wherein, the condition data is collected from a sensor of the robot that includes robot environmental conditions, wherein the robot environmental conditions include camera data or light detection and ranging data.

Example 70 is at least one machine-readable medium including instructions that, when executed by a machine, cause the machine to perform any method of Examples 54-69.

Example 71 is a system comprising means to perform any method of Examples 54-69.

Example 72 is a system for reliable real-time deployment of robot safety updates, comprising: means for collecting condition data for an environment in which a robot is operating; means for classifying the robot with a condition type; means for analyzing condition type data selected from the condition data based on the condition type to calculate a safety risk level for the robot; and means for identifying a microservice to provide a robot safety rule for the robot based on the safety risk level, wherein the microservice is identified using a safety prediction model generated from the condition type data.

In Example 73, the subject matter of Example 72 includes, means for encapsulating the robot safety rule for execution by an on premise edge compute node; means for validating the robot safety rule based on a comparison between outputs of the robot safety rule and expected outputs; and means for deploying the identified microservice to the robot upon validation of the robot safety rule.

In Example 74, the subject matter of Examples 72-73 includes, calculating the safety risk level further comprising: means for identifying a current robot safety rule for the robot; means for determining risk factors for the current robot safety rule using the condition type data; means for applying weights to the risk factors to generate weighted risk factor values; and means for summing the weighted risk factor values to create a risk factor sum, wherein the safety risk level is calculated by determining placement of the risk factor sum in a set of safety risk level thresholds.

In Example 75, the subject matter of Examples 73-74 includes, means for establishing a relationship between the on premise edge compute node and the robot; means for generating a microservice repository for the robot based on the relationship; and means for adding the microservice to the microservice repository for deployment to the robot using the microservice repository.

In Example 76, the subject matter of Example 75 includes, means for determining that a current microservice is unable to reduce the safety risk level; and means for removing the current microservice from the microservice repository.

In Example 77, the subject matter of Examples 72-76 includes, means for accessing a cloud repository of safety services; means for identifying a safety service from the cloud repository that will reduce the safety risk level; and means for generating the microservice for the identified safety service.

In Example 78, the subject matter of Examples 72-77 includes, means for obtaining a test case description for validation of the robot safety rule; transmitting instructions to a robot fleet control to initiate control of the robot according to the test case description; and means for determining the expected outputs of the robot safety rule based on the test case description.

In Example 79, the subject matter of Examples 73-78 wherein, the means for encapsulating the robot safety rule further comprises means for generating an encapsulation container for the robot safety rule.

In Example 80, the subject matter of Example 79 includes, means for identifying a robot type for the robot; and means for generating the encapsulated container using hardware virtualization or operating system virtualization based on the robot type.

In Example 81, the subject matter of Examples 73-80 includes, means for obtaining validation inputs from other robots, wherein the means for validating the robot safety rule includes means for evaluating the validation inputs to determine that the robot is operating correctly using the robot safety rule.

In Example 82, the subject matter of Examples 73-81 includes, means for transmitting a message to a human operator to request an environmental change to facilitate a testing scenario; means for transmitting control instructions to the robot to complete the testing scenario upon receipt of a response to the message indicating that the environmental change has been made; and means for receiving output from sensors of the robot, wherein the means for validating the robot safety rule includes means for evaluating the received output to determine if the received output is within a range of values of the expected output.

In Example 83, the subject matter of Examples 73-82 includes, means for calculating a testing variation time value based on a current workload of the robot; means for determining that completion time for a test scenario is lower than the testing time variation value; means for transmitting a robot control message to the robot to use robot safety rule to execute the test scenario; and means for receiving output from the robot upon completion of the test scenario, wherein the means for validating the robot safety rule includes means for evaluating the received output to determine if the received output is within a range of values of the expected output.

In Example 84, the subject matter of Examples 72-83 wherein, the condition data is collected from a public condition data source that includes outdoor environmental conditions, wherein the outdoor environmental conditions include a weather condition or a road condition.

In Example 85, the subject matter of Examples 72-84 wherein, the condition data is collected from a public condition data source that includes indoor environmental conditions, wherein the indoor environmental conditions include building configuration data or building operating conditions.

In Example 86, the subject matter of Examples 72-85 wherein, the condition data is collected from a private condition data source that includes profile data for at least one human-robot interaction.

In Example 87, the subject matter of Examples 72-86 wherein, the condition data is collected from a sensor of the robot that includes robot environmental conditions, wherein the robot environmental conditions include camera data or light detection and ranging data.

Example 88 is at least one machine-readable medium including instructions that, when executed by processing circuitry, cause the processing circuitry to perform operations to implement of any of Examples 1-87.

Example 89 is an apparatus comprising means to implement of any of Examples 1-87.

Example 90 is a system to implement of any of Examples 1-87.

Example 91 is a method to implement of any of Examples 1-87.

Example 92 is at least one machine-readable medium including instructions, which when executed by a machine, cause the machine to perform operations of any of the operations of Examples 1-87.

Example 93 is an apparatus comprising means for performing any of the operations of Examples 1-87.

Example 94 is a system to perform the operations of any of the Examples 1-87.

Example 95 is a method to perform the operations of any of the Examples 1-87.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for reliable real-time deployment of robot safety updates, comprising:
- at least one processor; and
- memory including instructions that, when executed by the at least one processor, cause the at least one processor to perform operations to:
  - collect condition data for an environment in which a robot is operating;
  - classify the robot with a condition type;
  - analyze condition type data selected from the condition data based on the condition type to calculate a safety risk level for the robot;
  - identify a microservice to provide a robot safety rule for the robot based on the safety risk level, wherein the microservice is identified using a safety prediction model generated from the condition type data;
  - establish a relationship between an on premise edge compute node and the robot, wherein the robot safety rule is encapsulated for execution by the on premise edge compute node;
  - generate a microservice repository for the robot based on the relationship; and
  - add the microservice to the microservice repository for deployment to the robot using the microservice repository.

2. The apparatus of claim 1, the memory further comprising instructions that, when executed by the at least one processor, cause the at least one processor to perform operations to:
- validate the robot safety rule based on a comparison between outputs of the robot safety rule and expected outputs; and
- upon validation of the robot safety rule, deploy the identified microservice to the robot.

3. The apparatus of claim 1, wherein the instructions to calculate the safety risk level further comprises instructions that, when executed by the at least one processor, cause the at least one processor to perform operations to:
- identify a current robot safety rule for the robot;
- determine risk factors for the current robot safety rule using the condition type data;
- apply weights to the risk factors to generate weighted risk factor values; and
- sum the weighted risk factor values to create a risk factor sum, wherein the safety risk level is calculated by determining placement of the risk factor sum in a set of safety risk level thresholds.

4. The apparatus of claim 1, the memory further comprising instructions that, when executed by the at least one processor, cause the at least one processor to perform operations to:
- determine that a current microservice is unable to reduce the safety risk level; and
- remove the current microservice from the microservice repository.

5. The apparatus of claim 1, the memory further comprising instructions that, when executed by the at least one processor, cause the at least one processor to perform operations to:
- access a cloud repository of safety services;
- identify a safety service from the cloud repository that will reduce the safety risk level; and
- generate the microservice for the identified safety service.

6. The apparatus of claim 1, the memory further comprising instructions that, when executed by the at least one processor, cause the at least one processor to perform operations to:
- obtain a test case description for validation of the robot safety rule;
- transmit instructions to a robot fleet control to initiate control of the robot according to the test case description; and
- determine expected outputs of the robot safety rule based on the test case description.

7. The apparatus of claim 1, wherein the instructions to encapsulate the robot safety rule further comprises instructions to generate an encapsulation container for the robot safety rule.

8. The apparatus of claim 7, the memory further comprising instructions that, when executed by the at least one processor, cause the at least one processor to perform operations to:
- identify a robot type for the robot; and
- generate the encapsulation container using hardware virtualization or operating system virtualization based on the robot type.

9. The apparatus of claim 2, the memory further comprising instructions that, when executed by the at least one processor, cause the at least one processor to perform operations to obtain validation inputs from other robots, wherein the instructions to validate the robot safety rule includes instructions to evaluate the validation inputs to determine that the robot is operating correctly using the robot safety rule.

10. The apparatus of claim 2, the memory further comprising instructions that, when executed by the at least one processor, cause the at least one processor to perform operations to:
- transmit a message to a human operator to request an environmental change to facilitate a testing scenario;
- upon receipt of a response to the message indicating that the environmental change has been made, transmit control instructions to the robot to complete the testing scenario; and
- receive output from sensors of the robot, wherein the instructions to validate the robot safety rule includes instructions to evaluate the received output to determine if the received output is within a range of values of the expected outputs.

11. The apparatus of claim 2, the memory further comprising instructions that, when executed by the at least one processor, cause the at least one processor to perform operations to:

calculate a testing variation time value based on a current workload of the robot;

determine that completion time for a test scenario is lower than the testing time variation value;

transmit a robot control message to the robot to use robot safety rule to execute the test scenario; and receive output from the robot upon completion of the test scenario, wherein the instructions to validate the robot safety rule includes instruction to evaluate the received output to determine if the received output is within a range of values of the expected outputs.

12. The apparatus of claim 1, wherein the condition data is collected from a public condition data source that includes outdoor environmental conditions, wherein the outdoor environmental conditions include a weather condition or a road condition.

13. The apparatus of claim 1, wherein the condition data is collected from a public condition data source that includes indoor environmental conditions, wherein the indoor environmental conditions include building configuration data or building operating conditions.

14. The apparatus of claim 1, wherein the condition data is collected from a private condition data source that includes profile data for at least one human-robot interaction.

15. The apparatus of claim 1, wherein the condition data is collected from a sensor of the robot that includes robot environmental conditions, wherein the robot environmental conditions include camera data or light detection and ranging data.

16. At least one non-transitory machine-readable medium including instructions for reliable real-time deployment of robot safety updates that, when executed by at least one processor, cause the at least one processor to perform operations to:

collect condition data for an environment in which a robot is operating;

classify the robot with a condition type;

analyze condition type data selected from the condition data based on the condition type to calculate a safety risk level for the robot;

identify a microservice to provide a robot safety rule for the robot based on the safety risk level, wherein the microservice is identified using a safety prediction model generated from the condition type data;

establish a relationship between an on premise edge compute node and the robot, wherein the robot safety rule is encapsulated for execution by the on premise edge compute node;

generate a microservice repository for the robot based on the relationship; and add the microservice to the microservice repository for deployment to the robot using the microservice repository.

17. The at least one non-transitory machine-readable medium of claim 16, further comprising instructions that, when executed by the at least one processor, cause the at least one processor to perform operations to:

validate the robot safety rule based on a comparison between outputs of the robot safety rule and expected outputs; and upon validation of the robot safety rule, deploy the identified microservice to the robot.

18. The at least one non-transitory machine-readable medium of claim 16, wherein the instructions to calculate the safety risk level further comprises instructions that, when executed by the at least one processor, cause the at least one processor to perform operations to:

identify a current robot safety rule for the robot;

determine risk factors for the current robot safety rule using the condition type data;

apply weights to the risk factors to generate weighted risk factor values; and sum the weighted risk factor values to create a risk factor sum, wherein the safety risk level is calculated by determining placement of the risk factor sum in a set of safety risk level thresholds.

19. The at least one non-transitory machine-readable medium of claim 16, further comprising instructions that, when executed by the at least one processor, cause the at least one processor to perform operations to:

determine that a current microservice is unable to reduce the safety risk level; and remove the current microservice from the microservice repository.

20. The at least one non-transitory machine-readable medium of claim 16, further comprising instructions that, when executed by the at least one processor, cause the at least one processor to perform operations to:

access a cloud repository of safety services;

identify a safety service from the cloud repository that will reduce the safety risk level; and generate the microservice for the identified safety service.

21. The at least one non-transitory machine-readable medium of claim 16, further comprising instructions that, when executed by the at least one processor, cause the at least one processor to perform operations to:

obtain a test case description for validation of the robot safety rule;

transmit instructions to a robot fleet control to initiate control of the robot according to the test case description; and determine expected outputs of the robot safety rule based on the test case description.

22. The at least one non-transitory machine-readable medium of claim 17, further comprising instructions that, when executed by the at least one processor, cause the at least one processor to perform operations to:

transmit a message to a human operator to request an environmental change to facilitate a testing scenario;

upon receipt of a response to the message indicating that the environmental change has been made, transmit control instructions to the robot to complete the testing scenario; and receive output from sensors of the robot, wherein the instructions to validate the robot safety rule includes instructions to evaluate the received output to determine if the received output is within a range of values of the expected outputs.

23. A system for reliable real-time deployment of robot safety updates, comprising:

means for collecting condition data for an environment in which a robot is operating;

means for classifying the robot with a condition type;

means for analyzing condition type data selected from the condition data based on the condition type to calculate a safety risk level for the robot;

means for identifying a microservice to provide a robot safety rule for the robot based on the safety risk level, wherein the microservice is identified using a safety prediction model generated from the condition type data;

means for establishing a relationship between an on premise edge compute node and the robot, wherein the robot safety rule is encapsulated for execution by the on premise edge compute node;

means for generating a microservice repository for the robot based on the relationship; and means for adding the microservice to the microservice repository for deployment to the robot using the microservice repository.

24. The system of claim 23, further:

means for validating the robot safety rule based on a comparison between outputs of the robot safety rule and expected outputs; and means for, upon validation of the robot safety rule, deploying the identified microservice to the robot.

25. The system of claim 23, the means for calculating the safety risk level further comprising:

means for identifying a current robot safety rule for the robot;

means for determining risk factors for the current robot safety rule using the condition type data;

means for applying weights to the risk factors to generate weighted risk factor values; and means for summing the weighted risk factor values to create a risk factor sum, wherein the safety risk level is calculated by determining placement of the risk factor sum in a set of safety risk level thresholds.

* * * * *